United States Patent
Arunmozhi et al.

(10) Patent No.: US 12,387,149 B2
(45) Date of Patent: *Aug. 12, 2025

(54) MULTISTAGE FEED RANKING SYSTEM WITH METHODOLOGY PROVIDING SCALABLE MULTI-OBJECTIVE MODEL APPROXIMATION

(71) Applicant: Microsoft Technology Licensing, LLC, Redmond, WA (US)

(72) Inventors: Madhulekha Arunmozhi, Sunnyvale, CA (US); Ian Ackerman, Mountain View, CA (US); Manas Somaiya, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,789

(22) Filed: Jul. 17, 2023

(65) Prior Publication Data

US 2023/0359945 A1 Nov. 9, 2023

Related U.S. Application Data

(62) Division of application No. 16/454,930, filed on Jun. 27, 2019, now Pat. No. 11,704,600.

(51) Int. Cl.
*G06N 20/20* (2019.01)
*G06F 18/2113* (2023.01)
*G06F 18/214* (2023.01)

(52) U.S. Cl.
CPC ......... *G06N 20/20* (2019.01); *G06F 18/2113* (2023.01); *G06F 18/214* (2023.01)

(58) Field of Classification Search
CPC combination set(s) only.
See application file for complete search history.

(56) References Cited

U.S. PATENT DOCUMENTS

| | | |
|---|---|---|
| 2009/0132515 A1 | 5/2009 | Lu et al. |
| 2016/0188606 A1 | 6/2016 | Bandyopadhyay et al. |
| 2018/0181873 A1 | 6/2018 | Chen |
| 2020/0410025 A1 | 12/2020 | Arunmozhi et al. |

OTHER PUBLICATIONS

Non-Final Office Action mailed on Apr. 2, 2021, in U.S. Appl. No. 16/454,944, 58 pages.

*Primary Examiner* — Zhiyu Lu
(74) *Attorney, Agent, or Firm* — Nicholson De Vos Webster & Elliott LLP

(57) ABSTRACT

Approximating a more complex multi-objective feed item scoring model using a less complex single objective feed item scoring model in a multistage feed ranking system of an online service. The disclosed techniques can facilitate multi-objective optimization for personalizing and ranking feeds including balancing personalizing a feed for viewer experience, downstream professional or social network effects, and upstream effects on content creators. The techniques can approximate the multi-objective model—that uses a rich set of machine learning features for scoring feed items at a second pass ranker in the ranking system—with the more lightweight, single objective model—that uses fewer machine learning features at a first pass ranker in the ranking system. The single objective model can more efficiently score a large set of feed items while maintaining much of the multi-objective model's richness and complexity and with high recall at the second pass ranking stage.

15 Claims, 12 Drawing Sheets

MULTISTAGE FEED RANKING SYSTEM WITH METHODOLOGY PROVIDING SCALABLE MULTI-OBJECTIVE MODEL APPROXIMATION

CROSS-REFERENCE TO RELATED APPLICATION

This application is a divisional of U.S. patent application Ser. No. 16/454,930 filed Jun. 27, 2019, now U.S. Pat. No. 11,704,600, which is incorporated herein by this reference in its entirety.

TECHNICAL FIELD

The present disclosure generally relates to data processing environments and, more particularly, to a multistage feed ranking system implementing methodologies providing scalable multi-objective model approximation.

BACKGROUND

Computers are very powerful tools for storing vast amounts of information and selecting small relevant portions thereof. Online service feeds are a common mechanism for storing information on computer systems while selecting small subsets of the information to provide to users. A typical feed is a stored "stream" or streams of a voluminous amount of heterogenous information items from which a small subset of information items is selected to present to a user. Some examples of a feed include an online social network feed, an online professional network feed, or an online shopping feed.

The information items (also referred to as "feed items") are typically presented to the user in a computer graphical user interface. For example, the graphical user interface can be a web page or the like. As an example, a feed presented to a user in a web page can include a handful of job postings, news articles, posts by the user's connections, or the like, in an online professional or online social network.

Between the stored feed items themselves and the users of the online service, a multistage feed ranking system is typically provided as a computing layer. In essence, the ranking system shields the online service user from knowing or even caring about the underlying feed item selection details.

A purpose of the ranking system can be to answer requests for personalized feeds. A personalized feed request can be defined generally as a request of the ranking system to select and present feed items to a user making the request. Typically, all personalized feed requests from users are processed by the ranking system. For example, in response to a personalized feed request from a user, the ranking system can score thousands of different feed items and select a few (e.g., ten to twenty) of the feed items to present to the user, all without user knowledge of the underlying ranking system implementation.

When selecting feed items to present to the user, the ranking system can balance multiple objectives. Typically, one of the objectives the ranking system can balance is relevance of the feed items presented to the user. The relevance of a feed item can be based on an estimate of how likely it is that the user will interact with the feed item when presented in the user's personalized feed and/or the relevance estimated based on targeted paid or unpaid user surveys. Such user interaction can include, for example, the user viewing, clicking on, sharing, liking, favoriting, or commenting on the feed item.

In addition to relevance of the feed items to the user, the objectives the ranking system can balance when selecting feed items to present to the user can include upstream effects and downstream effects of the user's interaction with the feed items.

Upstream effects are typically on the content creator of a feed item. As an example, an upstream effect on an author of a particular article that the user interacts with in their personalized feed can be the author writing an additional article that the author then makes available for selection and presentation by the ranking system. The author can be motivated to write the additional article based on receiving feedback from the online service about the many number of users that interacted in their personalized feeds with the earlier article.

Downstream effects are typically on users that are connected with a user in an online professional or online social network. As an example, a downstream effect of a user sharing a feed item can be some of the user's friends or connections in the online professional or online social network using the online service to also share the feed item with their friends or connections, and so on.

A personalized feed request can specify or indicate a user to which a personalized feed is to be presented, but typically does not state which particular feed items should be selected to present to the user. In other words, the personalized feed request does not tell how the request should be processed by the ranking system. Rather, components of the ranking system called the "first pass ranker" and the "second pass ranker" can score and select the feed items to present to the user in response to the personalized feed request.

Typically, the first pass ranker is responsible for selecting a candidate set of feed items by scoring each feed item in a large set of possible feed items. The second pass ranker is responsible for selecting a final set of feed items to present to the user by scoring each feed item in the candidate set that was selected by the first pass ranker. Typically, the final set is much smaller than the candidate set, which in turn is much smaller than the possible set. For example, the number of feed items in the final set can be an order of magnitude smaller than the number of items in the candidate set scored by the second pass ranker, which in turn can be an order of magnitude smaller than the number of possible feed items scored by the first pass ranker.

Modern first pass and second pass rankers rely on machine learning trained models to score and select feed items in response to personalized feed requests. Since the second pass ranker typically scores fewer feed items than the first pass ranker, the trained model used by the second pass ranker can be more complex (e.g., have more model parameters) so as to optimize the precision of the selections made by the second pass ranker with respect to the multiple objectives. On the other hand, the first pass ranker can be less complex (e.g., user fewer model parameters) so as to score feed items more quickly for efficient candidate generation from the large number of possible feed items that are scored by the first pass ranker.

With unlimited computing and power resources, it might be possible to score all possible feed items using the more complex model used by the second pass ranker and then directly select the final set of feed items therefrom to present to the user. In this case, generating an intermediary candidate set of feed items using a first pass ranker as in a multistage ranking setup would not be needed. However, such a single stage approach is typically not practical or is cost prohibitive. This is because of the large number of possible feed items that would need to be scored by the second pass ranker in the single stage approach. Thus, a multistage approach that requires fewer computing and power resources can be used.

A drawback of the multistage approach, however, is that recall at the second pass ranker can be less than it would be if only the second pass ranker were used as in the single stage approach. Here, recall at the second pass ranker can be measured based on the number of false negatives. A false negative exists if the second pass ranker, scoring a particular feed item in the possible set of feed items, would have included the particular feed item in the candidate set of feed items that the first pass ranker, scoring the particular feed item, did not include in the candidate set. For example, the first pass ranker can assign a lower relative score to the particular feed item than the second pass ranker. This lower recall (e.g., as measured by a recall score) can result from the relatively less complex model used by the first pass ranker. For example, the first pass ranker may not take into account all of the machine learning features taken into account by the more complex model used by the second pass ranker. As a result, there can be feed items that the first pass ranker does not include in the candidate set that the second pass ranker would have included in the final set presented to the user.

The present invention addresses these and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well understood, routine, or conventional, merely by virtue of their inclusion in this section.

DETAILED DESCRIPTION

Figure 1:
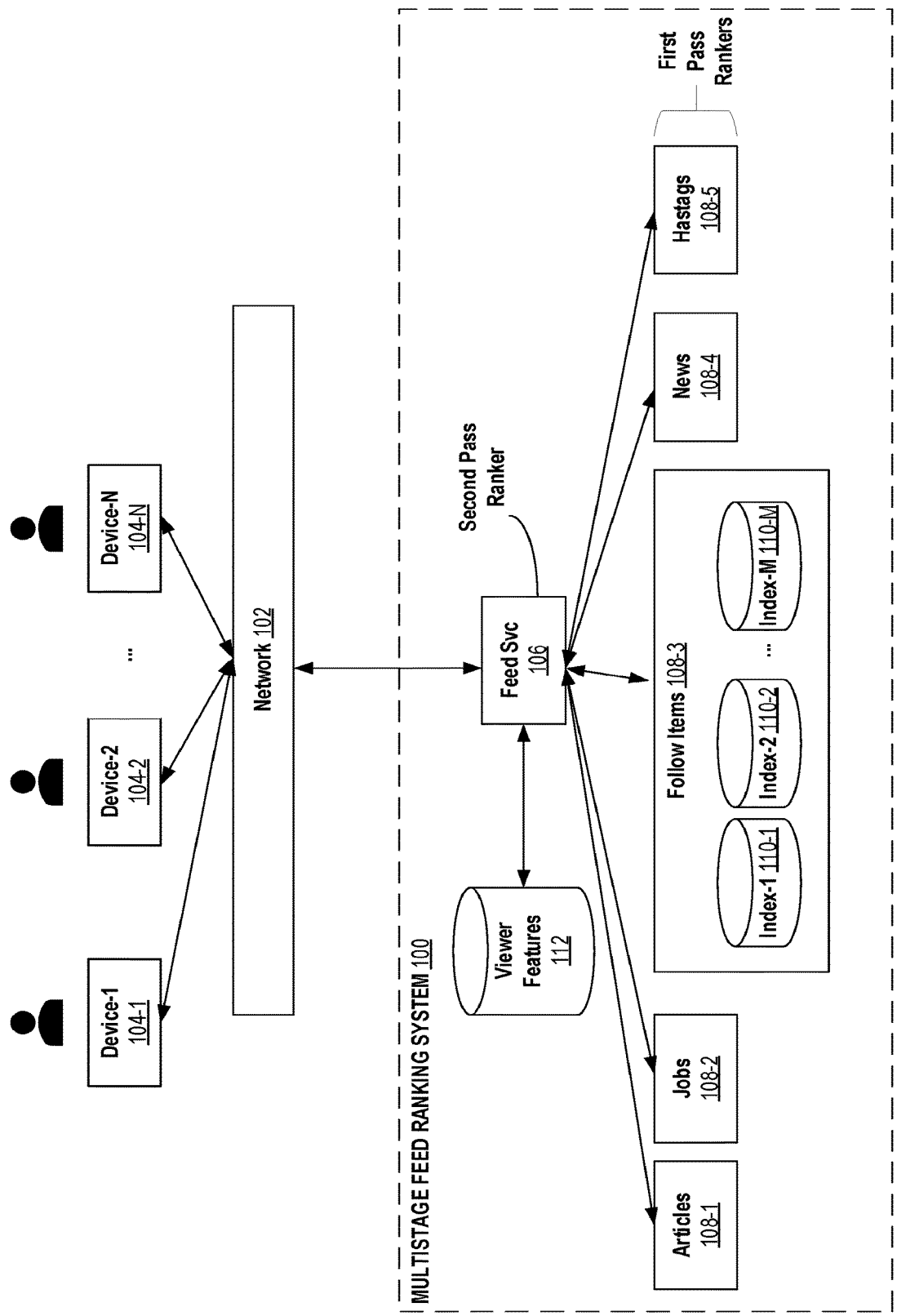
FIG. 1 is a block diagram of an example network computing environment including a multistage feed ranking system of an online service.

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

Approximating a Multi-Objective Model with a Single Objective Model—Overview

Techniques are disclosed herein for approximating a more complex multi-objective feed item scoring model using a less complex single objective feed item scoring model in a multistage feed ranking system of an online service. The disclosed techniques can facilitate multi-objective optimization for personalizing and ranking feeds including balancing personalizing a feed for viewer experience, downstream professional or social network effects, and upstream effects on content creators.

The disclosed techniques can approximate the multi-objective model—that uses a rich set of machine learning features for scoring feed items at a second pass ranker in the ranking system—with the more lightweight, single objective model—that uses fewer machine learning features at a first pass ranker in the ranking system. The single objective model can more efficiently score a large set of feed items while maintaining much of the multi-objective model's richness and complexity and with high recall at the second pass ranking stage.

As indicated in the Background section above, a feed ranking system that uses only a single ranking stage to score and rank large numbers of possible feed items, from which sets of final feed items are directly selected therefrom for presentation to users, can be impractical to meet scalability requirements of a large-scale online service with many users and many feed items while also meeting precision and recall targets of the ranking system.

With the disclosed techniques, the multistage feed ranking system can use at least two ranking stages. A first ranking stage can have less model complexity (e.g., have fewer model parameters) for quickly scoring a larger number of possible feed items and selecting a candidate set of feed items therefrom. A second ranking stage can have greater model complexity (e.g., have more model parameters) for scoring and ranking the candidate feed items with greater precision to identify the most relevant of the candidate feed items to select as the final feed items to present to the viewing user in the user's personalized feed.

At the same time, with the disclosed techniques, the first pass ranker using the single objective model can score the larger number of possible feed items and generate the candidate subset thereof that would approximately have the highest recall at the second pass ranking stage. The first pass ranker using the single objective model can do this efficiently with reduced computer processor, storage, and electric power resource consumption and with reduced personalized feed request processing latency, compared to the single stage approach. The multi-objective model at the second ranking stage can then be optimizing to prioritize precision of scoring the candidate feed items generated by the first pass ranker.

Two different techniques for approximating the multi-objective model using the single objective model are disclosed. The two techniques can be implemented in the alternative within the ranking system. Alternatively, the two techniques can be combined in an implementation as might be done in an ensemble implementation where both techniques are used to score a possible feed item, possibly in a parallel computing manner, and the resulting two scores subsequently combined, possibly after weighting differently each of the individual scores, to produce a final first pass ranking score for the feed item.

According to a first of the two techniques, a machine learning model is trained with different weights to incorporate the multiple objectives in the single objective model. According to this technique, viral user input actions on feed items presented in personalized feeds are weighted higher during training than click user input actions which are weighted higher during training than negative user actions.

Viral user input actions can include user input actions that can have downstream effects in an online professional or social network. For example, a viral user input action can encompass, for example, liking, commenting on, reacting to, or sharing a feed item. Click user input actions are a superset of viral user input actions but also include user input actions that may not have downstream effects in an online professional or social network such as, for example, a click user input action that merely expands or navigates to the feed item content for further reading or inspection by the viewer. Negative user actions are defined by the absence of click user input actions.

According to a second of the two techniques, a linear regression model is trained as the single objective model using second pass ranking scores generated by the second pass ranker as labels for the training examples. Because the second pass ranking score reflects the balance of the multiple objectives, it is useful for representing the multiple objectives as a single objective at the first pass ranking stage.

With the first and second techniques above for approximating the multi-objective model with the single objective model, the number of model parameters of the single objective model can be reduced relative to the number of model parameters of the multi-objective model, and thus more efficiently score a large number of possible feed items, yet still achieve good recall at the second pass ranking stage.

These and other techniques for approximating the multi-objective model of the second pass ranker using the single objective model of the first pass ranker are described in greater detail below with respect to the Drawings.

Recall at Scale—Overview

Techniques are also disclosed herein for approximating recall of a first pass ranker at the second pass ranking stage in a scalable manner. Here, recall of the first pass ranker at the second pass ranking stage for a given $K_{corpus}$ number of possible feed items can be measured generally as the extent of overlap between: (a) the top $K_{candidate}$ scoring number of feed items according to the second pass ranker, if the second pass ranker scored and ranked all $K_{corpus}$ possible feed items, and (b) the top $K_{candidate}$ scoring number of feed items scored by the first pass ranker, if the first pass ranker scored and ranked all $K_{corpus}$ possible feed items.

This measurement of overlap can be irrespective of rank. For example, if first pass ranker and the second pass ranker would select the same set of top $K_{candidate}$ number of feed items from the $K_{corpus}$ number of possible feed items in response to a personalized feed request regardless of the order of the feed items in the respective sets selected by the first pass and second pass rankers, then recall at the second pass ranking stage for the request is one-hundred percent (100%). Alternatively, the measurement of overlap can take rank into account. For example, some possible suitable ways to measure the overlap of the two sets taking rank order of the feed items in the sets into account can include Canberra distance, Kendall tau distance, and Fagin's version of Spearman's footrule.

As mentioned above, the number $K_{corpus}$ of feed items in a possible set of feed items for a personalized feed request can be much larger in number than the number $K_{candidate}$ of feed items in the candidate set of feed items for the request. As merely one example, the first pass ranker can score $K_{corpus}$=twenty thousand (20,000), or so, possible feed items for a personalized feed request and then select the top $K_{candidate}$=five hundred (500), or so, feed items for inclusion in the candidate set for the request. Given the greater complexity of the multi-objective model of the second pass ranker, having the second pass ranker score all $K_{corpus}$ number of possible feed items for the purpose of measuring recall of the request, while this can be accurate, can also be too demanding of computing and power resources.

Techniques are disclosed herein for approximating the recall of a first pass ranker at the second pass ranking stage for a personalized feed request. The techniques are efficient in that they do not require the second pass ranker to score all $K_{corpus}$ number of possible feed items to approximate the recall. Instead, according to one technique, the recall of the request is approximated with $N_{sample}$ number of feed items less than the $K_{candidate}$ number of feed items. The $N_{sample}$ number of feed items can be selected from the candidate set of feed items for the request for which first pass ranking scores and the second pass ranking scores are already logged and available. For example, the variable $N_{sample}$ may be equal to the typical number of feed items that a user views or scrolls through in a graphical user interface presenting a personalized feed. For example, the variable $N_{sample}$ may be ten (10) to twenty (20), or so.

Because the first pass ranker scores and the second pass ranker scores are already logged and available at a time of recall approximation, the techniques are much more computationally efficient than if all $K_{corpus}$ number of feed items were scored to compute the recall. At the same time, the smaller $N_{sample}$ number of feed items still gives a good approximation of the recall at the second pass ranking stage for the request.

These and other techniques for approximating recall at scale are described in greater detail below with respect to the Drawings.

The techniques disclosed herein for approximating recall of a first pass ranker at the second pass ranking stage may be used in conjunction with or independent of the techniques for approximating the multi-objective model using the single objective model. For example, the techniques disclosed herein for approximating recall at the second pass ranking stage may be applied to the multistage feed ranking system that does not implement the multi-objective model approximation techniques disclosed herein. On the other hand, the recall approximation techniques can be used in an implementation to evaluate the effectiveness of the single objective model at approximating the multi-objective model.

Scoring Model Optimization for
Scaling—Overview

According to another disclosed technique, a feature importance score for a target machine learning feature of a target machine learning model used in the multistage feed ranking system for scoring feed items is supplemented with a feature computing resource cost. The feature computing resource cost represents the cost of using the target feature in the target model in terms of computing resources such as CPU, memory, network resources, etc.

According to the technique, request traffic based on a plurality of personalized feed requests received at a production multistage feed item ranking system is captured. Some or all of the captured request traffic is then replayed against a test multistage feed item ranking system in a first configuration. In the first configuration, the test ranking system in the first configuration scores feed items based on a target machine learning model that uses a target machine learning feature. During this first replay, computing resource usage of the test ranking system in the first configuration is monitored and metrics about the resource usage are recorded. Some or all of the captured request traffic is also replayed against a test ranking system in a second configuration. In the second configuration, the test ranking system in the second configuration scores feed items based on the target machine learning model that does not use the target machine learning feature. During this second replay, computing resource usage of the test ranking system in the second configuration is monitored and metrics about the resource usage are recorded. In addition, a feature importance metric for the target machine learning feature reflecting an importance of the target machine learning feature to accuracy of prediction generated by the target machine learning model is determined. A metric reflecting the computing resource usage of the test ranking system in the first configuration, a metric reflecting the computing resource usage of the test ranking system in the second configuration, and the feature importance metric can all be output to a computer user interface, database, or report.

From the information output to the user interface, database, or report, a tradeoff between feature importance and feature computing resource cost can be made to decide whether to have the target machine learning model use or not use the target machine learning feature in production, thereby improving the production multistage feed item ranking system and solving the technical problem of determining which machine learning features of a machine learning model represent the best tradeoff between feature importance and feature computing resource cost.

Terminology

The following definitions and discussion are offered for purposes of illustration, not limitation, in order to assist with understanding the present disclosure.

Feed Item

A "feed item" refers generally to a particular timestamped item of information that is stored and available for selection by the multistage feed ranking system for inclusion in a personalized feed. An information item does not actually need to be presented in a personalized feed to be considered a feed item, so long as the information item is available to be selected by the multistage feed ranking system for possible presentation in a personalized feed. Indeed, the techniques disclosed herein may be used to score thousands of possible feed items, or more, in the context of a personalized feed request and then select only ten to twenty, or so, of the feed items to present to the user.

The timestamp of a feed item may correspond approximately to when a user of the online service took a user action with the online service (e.g., click, like, share, comment, etc.) or may correspond approximately to when a user conducted an activity with the online service that caused the feed item to be generated by the online service. Generation of a feed item can include storing the feed item in computer storage media such that the feed item is available for scoring and selection by the multistage feed ranking system. The user that took the user action or that conducted the activity that caused the feed item to be generated by the online service is referred to herein as the "actor" of the feed item.

An information item can be made available for selection by the ranking system by being stored in computer storage media. When stored in computer storage media, the feed item can be stored in a machine-readable representation such as, for example, in eXtensible Markup Language (XML), JavaScript Object Notation (JSON), or other suitable structured data format.

A feed item may contain text and media. Media may include graphics, icons, photos, video, audio, etc. Instead of storing the media data as part of the feed item itself as stored in computer storage media, the feed item may contain a hyperlink or other type of link to the media data. An upstream process (e.g., a client application at a client device) receiving the feed item can reference the link in the received feed item to download or otherwise retrieve the media data.

Possible Feed Item

As used herein, a "possible" feed item encompasses a feed item stored and available for scoring by the first pass ranker in the context of a personalized feed request.

Candidate Feed Item

A "candidate" feed item encompasses a possible feed item scored by the first pass ranker that, on the basis of the first pas ranker's score for the possible feed item, is made available by the first pass ranker to the second pass ranker for scoring by the second pass ranker in the context of the request.

Final Feed Item

A "final" feed item encompasses a candidate feed item that, on the basis of the second pass ranker's score for the candidate feed item, is selected by the second pass ranker to be presented to a user in the context of request. In the context of the request, all final feed items are candidate feed items and all candidate feed items are possible feed items, but not all possible feed items are candidate feed items and not all candidate feed items are final feed items.

Model Parameter ("Parameter")

As used herein, the term "model parameter," or just "parameter" in the context of a machine learning model, refers generally to a configuration variable that is internal to a machine learning model and whose value can be estimated from data. Parameters can be required by the model when making predictions or inferences such as, for example, when scoring a feed item that balances the multiple objectives. Parameters can define the skill of a model on a particular problem. Parameters can be estimated or learned from data. Parameters are often not explicitly programmed or set by a computer programmer. Parameters can be saved as part of a trained model. Model parameters can be estimated using an optimization algorithm that searches through possible parameters values to find particular model parameters that "fit" the training data. Non-limiting examples of model parameters include weights in an artificial neural network model, support vectors in a support vector machine model, and coefficients in a linear regression or a logistic regression model.

Machine Learning Feature ("Feature")

As used herein, the term "machine learning feature," or just "feature" in the context of a machine learning model, refers generally to an individual measurable property or characteristic of a phenomenon being observed. A feature may be input to a machine learning model as a numeric value that represents the individual measured property or characteristic of the phenomenon being observed, possibly as part of feature vector that contains other numeric values for other features. As one skilled in the art will understand, a feature may be regularized and/or normalized (e.g., scaled) before being input to a machine learning model.

Machine Learning Label ("Label")

As used herein, the term "machine learning label," or just "label" in the context of a machine learning model, refers generally to the thing being predicted by the machine learning model. For example, a label can be the y variable in a linear regression, the future price of wheat, the kind of animal shown in a picture, the meaning of an audio clip, or just about anything.

Introduction to the Figures

The following description will focus on embodiments of the present invention, which are implemented in a distributed computing system operated by a large-scale online server in an Internet-connected environment running in a data center or data centers or other computer hosting facility or facilities. The present invention, however, is not limited to any one particular online service or any one particular networked computing environment. Instead, those skilled in the art will find that the techniques of the present invention can be advantageously implemented by a variety of different online services that provide personalized feeds, including, for example, personalized shopping feeds, personalized news feeds, personalized information feeds, or other types of personalized feeds. In addition, those skilled in the art will recognize that the techniques of the present invention can be embodied in a variety of different networked computing environments, including other client-server networked computing environments. Therefore, the description of the embodiments that follows is for purposes of illustration and not limitation.

The embodiments described below are primarily described with reference to block diagrams or flowcharts. As to the flowcharts, each block within the flowcharts represents both a method step and an apparatus element for performing the method step. Depending on the implementation at hand, the corresponding apparatus element may be configured in hardware, software, or combinations thereof.

Example Multistage Feed Ranking System

FIG. 1 is a block diagram that depicts an example networked computing environment having example multistage feed ranking system 100 of an online service. Users use their respective personal computing devices 104 to interact with the online service over data communications network 102. The online service can be large-scale online service serving many users (e.g., thousands or millions or more).

Social Network

The online service can provide end-user features that allow users to participate in an online professional or social network. Such end-user features can allow users to establish relationships or connections in the professional or social network with other users and interact and collaborate with those users using the online service.

Herein, the term "social network" will be used broadly to refer to any type of network representing connections or relationships between users of an online service that facilitates online user interaction or online user collaboration via the online service. For example, a social network can encompass any of a friends and family social network (e.g., Facebook™, Twitter™, Google+™, MySpace™, or the like), a multimedia sharing social network (e.g., YouTube™, Flickr™, Instagram™, or the like), a professional social network (e.g., LinkedIn™, Classroom 2.0™, or the like), or an informational social network (e.g., Quora™, Nextdoor™, or the like). The techniques disclosed herein are not limited to any particular type of social network, and the techniques can be applied in the context of a variety of different types of social networks, including any of the example types of social networks listed in the prior sentence.

A user of the online service can hold a user account with the online service. By way of the user account, the user can authenticate with the online service such that a unique identity of the user is established with the online service. For example, the user can authenticate with the online service by proving possession of a preestablished shared secret (e.g., a password) associated with the user account.

User Accounts

Other ways of authenticating with the online service are possible (e.g., biometric authentication or digital certificate authentication) and the present invention is not limited to any particular manner of user authentication so long as it facilitates identification of an identity of a particular individual user or a particular group of users of the online service, if a group, team, or other type of shared account is being used. The identity can be in the form of a user identifier, an identifier of a group of users, a user account identifier, a group account identifier, a user session identifier, or the like.

Once the user has authenticated with the online service, the online service can perform various operations on the user's behalf in response to receiving a network request from the user's device. For example, the online service can generate a personalized feed for the user in response to receiving a request from the user's device according to techniques disclosed herein.

User Devices

User devices 104 can be standard electronic personal computing devices. For example, a user device can be stationary computer such as a desktop or workstation computer or the like. A user device can be a portable computer such as a laptop computer, a tablet computer, a mobile phone, a smart phone, or the like.

A user device can include, or be operatively coupled to, a computer display screen on which a graphical user interface driven by the online service can be presented to the user. The graphical user interface can encompass web pages, web content, or the like served by the online service to user devices 104 over network 102. The online service can drive the graphical user interface with the aid of a client application that is installed and executing the user device. The client application can be a web browser application or a mobile application, for example.

Data Communications Network

Data communications network 102 can be standard and can encompass one or more different types of networks. For example, data communications network 102 can encompass one or more cellular networks (e.g., GSM, IS-95, UMTS, CDMA2000, LTE, 5G, etc.), one or more wireless networks (e.g., an IEEE 802.11 network) and/or one or more internet protocol (IP) networks (e.g., the Internet).

A personalized feed request can be sent from a user device over network 102 to the online service. The personalized feed request can be carried in one or more hypertext transfer protocol (HTTP) requests or one or more secure-hypertext transfer protocol (HTTPS) requests.

The response to the personalized feed request can be sent from the online service over network 102 to the user device in one or more hypertext transfer protocol (HTTP) responses thereto or one or more secure-hypertext transfer protocol (HTTPS) responses thereto.

The present invention is not limited to HTTP or HTTPS for sending and responding to personalized feed requests. Other suitable application-layer protocols can be used such as, for example, an application-layer protocol suitable for implementing remote procedure calls (RCPs) or messaging queuing (e.g., the Advanced Message Queuing Protocol (AMQP)) can be used instead.

One skilled in the art will recognize that a personalized feed request sent from a user device (e.g., 104-2) over network 102 and received by multistage feed ranking system 100 can in a practical implementation be composed of a chain of network requests that can take different forms. For example, a first HTTP or HTTPS request representing a personalized feed request can be sent from a user device (e.g., 104-2) over network 102 and received by an edge computing device of the online service. The edge computing device may in turn send a second HTTP or HTTPS request to feed service 106 that is based on the first HTTP or HTTPS request yet may not be exactly identical to the first HTTP or HTTPS request. Next, feed service 106 may send a third HTTP or HTTP request to a first pass ranker (e.g., 108-3). Similarly, a chain of network responses may be sent in response to the chain of network requests. Thus, reference herein to a personalized feed request is not intended to encompass only a single network request and can encompass a chain or cascade of multiple network requests.

Feed service 106 and each of first pass rankers 108 can each be implemented on one or more computer systems interconnected by one or more data communications networks (e.g., one or more Internet Protocol (IP) networks).

Feed Service/Second Pass Ranker

Feed service 106 can include the second pass ranker. The second pass ranker of feed service 106 can use the multi-objective scoring model to score candidate feed items in the context of a personalized feed request. Based on the scores for the candidate feed items, the second pass ranker can select one or more the candidate feed items to present to a user in a personalized feed. For example, the second pass ranker can select the top twenty, or so, scoring feed items from the set of candidate feed items to return over network 102 to the user's device (e.g., 104-2) for presentation to the user in a graphical user interface there. The graphical user interface can be driven by a client application at the user's device based on the feed item information received from the second pass ranker. The client application can be a web browsing application ("web browser") or mobile application ("mobile app"), as two non-limiting examples of possible client applications.

First Pass Ranker(s)

First pass rankers 108 collectively score a set of possible feed items in the context of a personalized feed request. Based on the scores for the possible feed items, first pass rankers 108 can select a set of candidate feed items to provide to the second pass ranker of feed service 106 in the context of the request. For example, first pass rankers 108 may score tens of thousands of possible feed items in the context of a personalized feed request and selected a few hundred of the top scoring feed items to provide to the second pass ranker as the candidate set.

Each of first pass rankers 108 can use the single objective model that approximates the multi-objective model. However, there is no requirement that each and every of first pass rankers 108 use the single objective model and none or only some, but less than all, of first pass rankers 108 can incorporate the single objective model that approximates the multi-objective model.

In the example of FIG. 1, first pass rankers 108 include first pass ranker 108-1 for scoring article feed items, first pass ranker 108-2 for scoring job feed items, first pass ranker 108-3 for scoring follow feed items, first pass ranker 108-4 for scoring news feed items, and first pass ranker 108-5 for hashtag feed items.

Article feed items scored by first pass ranker 108-1 can include user authored articles, scholarly articles, informational articles, and other types of written articles. An article feed item can contain, or link to, the text of an authored article and any associated media.

Job feed items scored by first pass ranker 108-2 can include job opening, job postings, job listings, employment opportunities, or the like. A job feed item can contain, or link to, a text description of the job such as, for example, job requirements and any associated media.

Follow feed items scored by first pass ranker 108-3 can include activities by users in a social network. A follow feed item can contain, or link to, a text description of a user activity and any associated media.

News feed items scored by first pass ranker 108-4 may include news articles, news reports, or the like. A news feed item can contain, or link to, the text of the news article and any associated media.

Hashtag feed items scored by first pass ranker 108-5 may include social network posts, comments, tweets, photo shares, or the like that include different hashtags (e.g., "Move", "#selfie", "#happy") or other type of metadata tag. A hashtag feed item can contain, or link to, the text containing a hashtag or metadata tag.

Follow feed items scored by first pass ranker 108-3 can include, but are not limited to, activities by users interacting with feed items in their personalized feeds. Such feed item interaction activities can include, but are not limited to, liking a feed item, sharing a feed item with one or more other users in the social network, commenting on a feed item, and clicking on (viewing) a feed item.

First pass rankers 108 shown in FIG. 1 are provided merely as an example of a possible set of first pass rankers that can be used in the multistage feed ranking system. However, a different set of first pass rankers can be used in a particular implementation. For example, a different set of first pass rankers may score a different set of feed item types.

More or fewer first pass rankers can also be used in a particular implementation. For example, as few as a single first pass ranker can be used in an implementation. Alternatively, more than five (5) first pass rankers can be used in an implementation.

In addition, it is not necessary for a first pass ranker to score a homogeneous type of feed items, and a single first pass ranker can score heterogeneous types of feed items. For example, a single first pass ranker can be used to score all of article feed items, jobs feed items, follow feed items, news feed items, and hashtag feed items.

It is also not required that heterogenous types of feed items be scored by a set of first pass rankers. For example, multistage feed ranking system 100 can use just first pass ranker 108-3 to score follow feed items and not use any of first pass rankers 108-1, 108-2, 108-4, or 108-5.

Click and Viral User Input Actions

There can be at least two different types of user input actions on a feed item presented in a personalized feed: "click" user input actions and "viral" user input actions. All viral user input actions are click user input actions but not all click user input actions are viral user input actions. That is, click user input actions can be a superset of viral user input actions.

A "viral" user input action on a feed item by a user can be a user input action on the feed item that does have an express or implied target user or target users of the viral user input action. For example, when the user likes, shares, or comments on a feed item presented in the user's personalized feed, the user intends for other users in the social network (e.g., the user's first-degree connections in the social network) to receive notification of the like, share, or comment. A user may take a viral user input action on a feed item in a similar manner that a user takes a click user input action, by using a computer user input device to direct user input toward the feed item as presented in a graphical user interface. The graphical user interface may provide particular user interface controls (e.g., interactive buttons, icons, hyperlinks, etc.) for taking respective viral actions on the associated feed item.

In addition to a "click" user input action being a viral user input action, a click user input action on a feed item by a user can be a user action on the feed item that does not have an express or implied target user of the click action. For example, when a user clicks on a feed item, the user can intend to view or read the feed item, but not to inform other users in the social network that the user is viewing or reading the feed item. Other possible click actions on a feed item can include, but are not limited to, a user using a computer user input device (e.g., a keyboard, a pointing device, or touch sensitive surface) to select, click on, double-click on, scroll to, click and drag, expand, zoom, or hover over the feed item as presented in the user's personalized feed.

In addition to click user input actions and viral user input actions, there can be dwell time user actions. A dwell time user action corresponds to a feed viewer viewing a feed item presented in the feed for a length of time. The length of time is typically measured in milliseconds at client users based on view port tracking.

Example Operation

In operation, multistage feed ranking system 100 receives a personalized feed request at feed service 106. The request received may be based on or derived from a request sent over network 102 from a client device (e.g., 104-2), which can be the personalized feed request or another request that causes feed service 106 to receive the personalized feed request.

The user of the client device (e.g., 104-2) that caused feed service 106 to receive the personalized feed request (e.g., by authenticating with the online service and navigating to a particular web page of the online service using an application at the user's client device) is referred to herein as the "viewer." Each personalized feed request received by feed service 106 can have a respective viewer for which multistage feed ranking system 100 selects feed items to present to the viewer at the user's client device in response to receiving the personalized feed request. The viewer's identity may be established by the online service through an authentication process or by other means (e.g., by a network address of the user's device or by a session cookie or token transmitted to the online service from the user's device).

Upon receiving the personalized feed request, feed service 106 can send a corresponding request to each of first pass rankers 108. Each of first pass rankers 108 can then score a respective set of possible feed items using the first pass ranker's respective first pass scoring model, which may or may not be the single objective model that approximates the multi-objective model disclosed herein.

Each of first pass rankers 108 can use a first pass scoring model with different model parameters depend on the type or types of feed items scored. For example, the set of model parameters used by the first pass scoring model of first pass ranker 108-2 to score article feed items may be different from the set of model parameters used by the first pass scoring model of first pass ranker 108-3 to score follow feed items.

In this regard, it should be noted that even if multiple of first pass rankers 108 use the single objective model to approximate the multi-objective scoring model, each of those first pass rankers may use different model parameters. For example, even if both first pass ranker 108-1 and first pass ranker 108-3 use the single objective model to score feed items, the model parameters of the single objective model used by first pass ranker 108-2 can be optimized during learning for scoring article feed items while the model parameters of the single objective model used by first pass ranker 108-3 can be optimized during learning for scoring follow feed items.

The scoring of feed items by first pass rankers 108 can occur in a parallel processing manner. For example, each of first pass rankers 108 can score a respective set of possible feed items at the same time or at an overlap in time that one or more others of first pass ranker 108 are scoring possible feed items.

Each of first pass rankers 108 returns a top scoring number of respective possible feed items to feed service 106 as candidates for presentation to the viewer. Using the multi-objective model, feed service 106 scores all the candidate feed items received from first pass rankers 108. Feed service 106 then selects a top scoring number of the candidate feed items to return to the viewer's client device for presentation there in a personalized feed.

First pass rankers 108 can score different numbers of possible feed items and return different numbers of candidate feed items for scoring by the second pass ranker at feed service 106. For example, each of first pass rankers 108-1, 108-2, 108-4, and 108-5 can score a hundred, or so, respective possible feed items for a given personalized feed request while first pass ranker 108-3 can score tens of thousands, or so, respective possible feed items for the request.

Likewise, each of first pass rankers 108-1, 108-2, and 108-4, and 108-5 can return to feed service 106, as candidate feed items, the top ten (10) scoring, or so, of the respective hundred, or so, possible feed items that the first pass ranker scores. On the other hand, first pass ranker 108-3 can return to feed service the top five hundred (500) scoring, or so, of the respective ten thousand, or so, respective possible feed items scored by first pass ranker 108-3.

First pass ranker 108-3 can score so many more possible feed items than others of first pass rankers 108 because of the large of volume of essentially continuous user activity that can occur in a large-scale social network that has a large number of users (e.g., hundreds of millions). To facilitate first pass ranker 108-3 efficiently scoring a large number of possible follow feed items in the context of the personalized feed request for the viewer, follow feed items can be indexed in distributed index 110.

Recent user activity of users in the social network may be indexed in distributed index 110. Distributed index 110 can have a number of index shards 110-1, 110-2, . . . , 110-M distributed across a plurality of computer systems. Each index shard can index feed items by user identifiers such that a user's recent activity for which the online service generated follow feed items is indexed at one or more of the index shards.

At an index shard where some or all of a particular user's recent activity is indexed, a timeline of follow feed items may be obtained for the user where the timeline includes follow feed items indexed at that index shard for the user's recent online service activities, in order of recency.

With this indexing arrangement, given a set of user identifiers representing connections with the viewer in the social network (e.g., the viewer's first, second, and third-degree connections in the social network), first pass ranker 108-3 can send a request to each index shard 110-1, 110-2, . . . , 110-M. The request may include the set of user identifiers representing the first, second, and third-degree connections with the viewer in the social network that the viewer is following the activities of.

Upon receiving the request at an index shard, the receiving index shard (e.g., 110-2) can apply the first pass scoring model used by first pass ranker 108-3 to score follow feed items in indexed timelines for followed users of the viewer's first, second, or third-degree connections in the social network.

As an example, for the personalized feed request, each index shard 110-1, 110-2, . . . , 110-M can score approximately two-thousand (2,000) and four-thousand (4,000), or so, follow feed items for the request. Each index shard can select the top five hundred (500), or so, scoring follow feed items that are scored by the index shard. Then, the top five hundred (500), or so, scoring follow feed items among all of the top five hundred (500), or so, scoring follow feed items from all of the index shards 110 110-1, 110-2, . . . , 110-M can be returned to feed service 106 for inclusion in the candidate set for the request.

Feed Item and Viewer-Related Features

When scoring a feed item, the multi-objective model used by the second pass ranker and the single objective model used by a first pass ranker can accept a variety of different machine learning features as input. As disclosed herein, the single objective model may accept fewer features than the multi-objective model yet still fairly approximates the multi-objective model as measured by approximated recall at the second pass ranking stage.

The features accepted as input by the multi-objective model and the single objective model when scoring a feed item in the context of a personalized feed request from a viewer, can include, but are not limited to, features of the viewer ("viewer features"), features of the feed item ("feed item features"), features of both the viewer and the feed item ("viewer-feed item features"), features of both the viewer and the actor of the feed item ("viewer-actor features"), features of all of the viewer, the actor of the feed item, and the feed item ("viewer-actor-feed item features"), and global features.

Viewer features can be stored in viewer feature database 112 accessible to the second pass ranker at feed service 106. Viewer feature database 112 can also store other viewer-related features such as viewer-feed item features, viewer-actor features, and/or viewer-actor-feed item features. Viewer feature database 112 can also be accessible to first pass rankers 108.

The single objective model used at a first pass ranker (e.g., 108-3) can use feed item features of the feed item being scored but may not use viewer-related features, or may use only some viewer-related features, to score the feed item. In addition to or instead of using feed item features of the feed item, the multi-objective model of the second pass ranker can use viewer-related features obtained from viewer feature database 112 when scoring the feed item. More generally, the single objective model used at a first pass ranker (e.g., 108-3) may use fewer features to score a feed item than the number of features used by the multi-objective model at the second pass ranker to score the feed item. For example, the single objective model may use a subset of the features used by the multi-objective model.

The single objective model used at a first pass ranker may not use any viewer-related features to score a given feed item. In this case, the first pass ranker may not require access to viewer feature database 112.

The single objective model can use a fewer number of viewer-related features to score a given feed item than the number of viewer-related features used by the multi-objective model at the second pass ranker to score the feed item. In this case, the first pass ranker 108 may have access to viewer feature database 112 for obtaining the viewer-related features used. Alternatively, feed service 106 can obtain viewer-related features from viewer feature database 112 in response to receiving a personalized feed request and then "push down" the obtained viewer-related features to the first pass ranker.

Because the first pass ranker can use fewer viewer-related features to score the feed item, the first pass ranker does not need to store the unused viewer-related features or retrieve the unused viewer related features from viewer feature database 112 or use the unused viewer-related features to compute the feed item score, thereby conserving computer processor, storage media, computer network, and electrical power resources of multistage feed ranking system 100. Nonetheless, the single objective model is still able to adequately approximate the multi-objective model.

For scoring a given feed item in the context of a personalized feed request at the first pass ranker or the second pass ranker, viewer features can include precomputed features (computed prior to scoring the given feed item in the context of the request) about the viewer of the personalized feed request. The viewer features available in an implementation may vary according to the requirements of the particular implementation at hand including based on the type of online service and the type of social network. For example, the viewer features can include all of the following features, a subset of these features, or a superset of a subset:

the clock times of a last number (e.g., 4) of visits by the viewer to the viewer's personalized feed, the number of first-degree connections the viewer has in the social network, an identifier of the viewer, a number of invites sent by the viewer to other users to be a first-degree connection of the viewer in the social network, a score reflecting the viewer's interest in changing jobs, and a number of endorsements the viewer has received in the social network.

For scoring a given feed item in the context of a personalized feed request at the first pass ranker or the second pass ranker, feed item features can include precomputed features (computed prior to scoring the given feed item in the context of the request) about the given feed item. The feed item features available in an implementation may vary according to the requirements of the particular implementation at hand including based on the type of online service, the type of social network, and the types of available feed items. For example, the feed item features can include all of the following features, a subset of these features, or a superset of a subset:
- a bias term for the feed item when used a training example when training a machine learned model,
- an identifier of the actor of the feed item,
- a content type of the feed item, and
- a time when the feed item is created.

For scoring a given feed item in the context of a personalized feed request at the first pass ranker or the second pass ranker, viewer-feed item features include precomputed features (computed prior to scoring the given feed item in the context of the request) about the viewer of the personalized feed request and the given feed item. The viewer-feed item features available in an implementation may vary according to the requirements of the particular implementation at hand including based on the type of online service, the type of social network, and the types of available feed items. For example, the viewer-feed item features can include an affinity measurement between the viewer and the feed item based on past (prior to the personalized feed request) interactions by the viewer with the online service and past (prior to the personalized feed request) impressions by the online service to the viewer.

For scoring a given feed item in the context of a personalized feed request at the first pass ranker or the second pass ranker, viewer-actor features and viewer-actor-feed item features can include precomputed features (computed prior to scoring the given feed item in the context of the request) about the viewer, the actor of the given feed item, and the given feed item. The viewer-actor features and viewer-actor-feed item features available in an implementation may vary according to the requirements of the particular implementation at hand including based on the type of online service, the type of social network, and the types of available feed items. For example, the viewer-actor features and viewer-actor-feed item features can include all of the following viewer-actor features and viewer-actor-feed item features, a subset of these features, or a superset of a subset:
- a measured strength of connection between the viewer and the actor in the social network,
- a measured affinity between the viewer and the actor based on past interactions and past impressions associated with the viewer and the actor,
- whether the viewer and the actor have a first-degree connection in the social network with each other,
- whether the viewer invited the actor to be a first-degree connection in the social network,
- whether the actor invited the viewer to be a first-degree connection in the social network, and
- a number of endorsements of the viewer by the actor.

For scoring a given feed item in the context of a personalized feed request at the first pass ranker or the second pass ranker, global features include precomputed features (computed prior to scoring the given feed item in the context of the request) that are independent of the viewer, the actor of the given feed item, and the feed item. The global features available in an implementation may vary according to the requirements of the particular implementation at hand including based on the type of online service and the type of social network. For example, the global features can include a current time of the personalized feed request.

Features may be precomputed prior to scoring a given feed item in the context of a personalized feed request at a first pass ranker or at the second pass ranker. For example, a feature may be precomputed prior to receiving the personalized feed request at feed service 106 and retrieved from a database (e.g., viewer feature database 112) in response to receiving the personalized feed request at feed service 106 before scoring the given feed item at the first pass ranker or at the second pass ranker. As another example, a feature may be precomputed after receiving the personalized feed request at feed service 106 but before scoring the given feed item at the first pass ranker or at the second pass ranker.

The above described features are presented for purposes of illustrating possible machine learning features that may be involved in scoring a feed item in the context of a personalized feed request. The present invention, however, is not limited to any particular set of machine learning features. In particular, a viewer feature/non-viewer feature distinction is not necessary to the invention, but is used to provide a framework for discussion. Instead, one skilled in the art will recognize that the present invention can be implemented with virtually any set of machine learning features useful for computing scores for feed items at a first pass ranker or at a second pass ranker of a multistage feed ranking system of an online service.

Conclusion

The above described multistage feed item ranking system is presented for purposes of illustrating a possible multistage feed ranking system in which techniques disclosed herein can be implemented. The present invention, however, is not limited to any particular multistage feed ranking system. In particular, a two ranking stage distinction is not necessary to the invention, but is used to provide a framework for discussion. Instead, one skilled in the art will recognize that the present invention can be implemented in a multistage ranking system with more than two ranking stages including possibly one or more intermediate ranking stages between a first ranking stage and a second ranking stage.

Example Multi-Objective Feed Item Scoring Model

Figure 2:
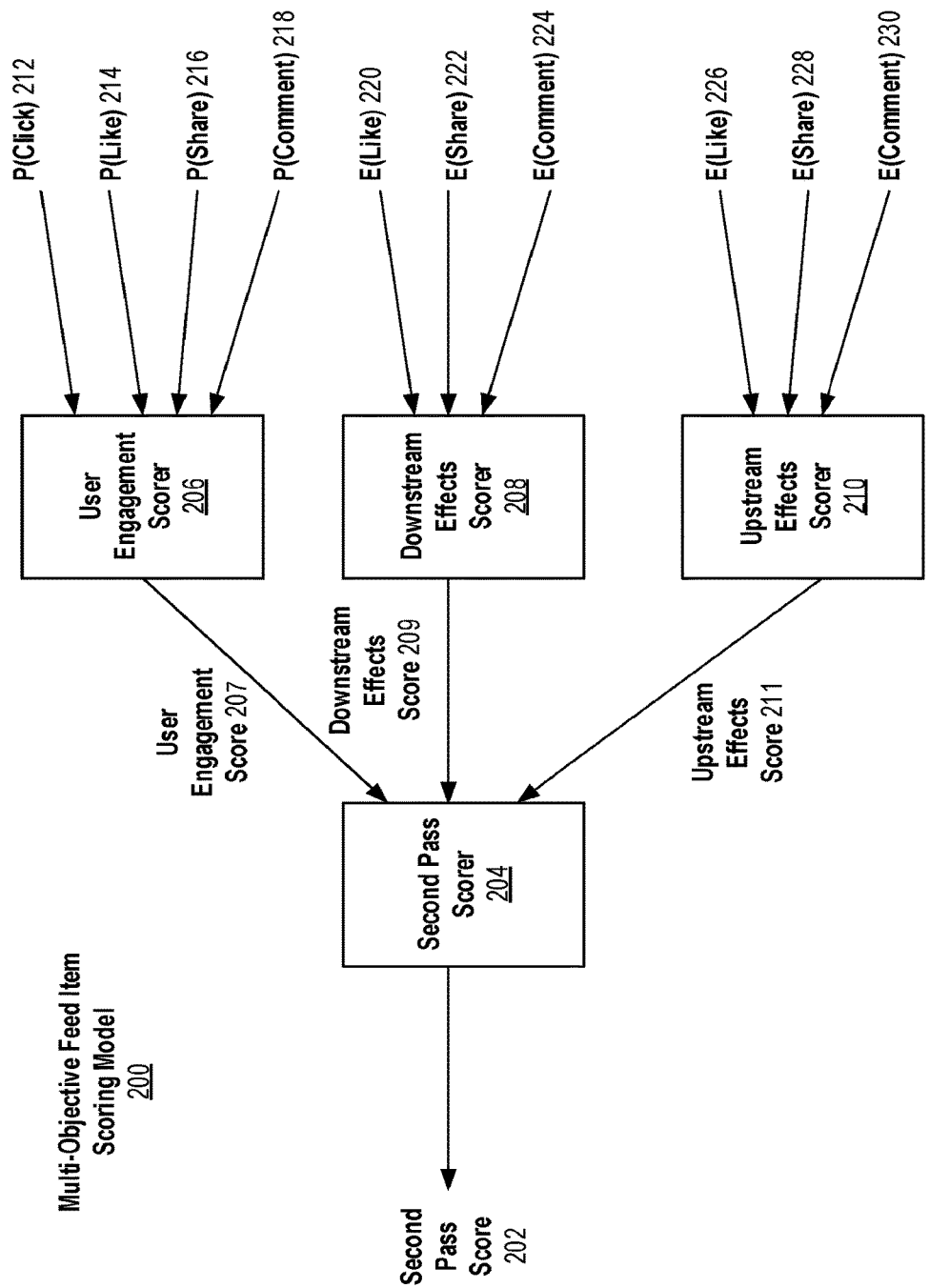
FIG. 2 is a block diagram of an example multi-objective feed item scoring model.

FIG. 2 is a block diagram of example multi-objective feed item scoring model 200 that may be used at the second pass ranker of the multistage feed ranking system. For example, model 200 can be used by the second pass ranker of feed service 106.

Model 200 generates a second pass ranking score 202 for a target feed item in the context of a target personalized feed request for a target viewer. For example, the target feed item may be one of the candidate feed items provided by the first pass ranker to the second pass ranker in the context of the request.

Model 200 can be a collection of multiple component models. In particular, model 200 includes second pass scorer 204 that combines scores from user engagement scorer 206, downstream effects scorer 208, and upstream effect scorer 210. In particular, user engagement scorer 206 generates user engagement score 207, downstream effects scorer 208 generates downstream effect score 209, and upstream effects scorer 210 generates upstream effects score 211. For example, second pass scorer 204 can sum the scores 207, 209, and 211, possibly after weighting each of the scores 207, 209, and 211 with different respective weights. The different respective weights may be determined empirically or by other means (e.g., by pairwise Pareto optimization).

User Engagement Scorer

User engagement scorer 206 computes and outputs user engagement score 207 that is input to second pass scorer 204. User engagement score 207 can be computed by user engagement scorer 206 by combining probability of click score 212, probability of like score 214, probability of share score 216, and probability of comment score 218. For example, user engagement scorer 206 can sum the scores 212, 214, 216, and 218, possibly after weighting each of the scores 212, 214, 216, and 218 with different respective weights. The different respective weights may be determined empirically or by other means (e.g., by pairwise Pareto optimization).

Probability of click score 212 reflects a probability that the target viewer will take a click action or other similar user input action on the target feed item if the target feed item is presented to the target viewer in response to the target personalized feed request.

Probability of like score 214 reflects a probability that the target viewer will take a like, favorite, thumbs up, or other similar viral action on the target feed item expressing approval or favorable sentiment of the target feed item by the viewer if the target feed item is presented to the target viewer in response to the target personalized feed request.

Probability of share score 216 reflects a probability that the target viewer will share the target feed item with one or more other users in the social network if the target feed item is presented to the target viewer in response to the target personalized feed request.

Probability of comment score 218 reflects a probability that the target viewer will comment on the target feed item if the target feed item is presented to the target viewer in response to the target personalized feed request.

Each of scores 212, 214, 216, and 218 can be generated by a respective trained logistic regression model trained to predict the probability of the respective action given an input feature vector. For example, the probability may be predicted as a numerical value between zero (0) and one (1) with a value closer to one (1) representing more probable and a value closer to zero (0) representing less probable, or vice versa. The input feature vector may represent some or all of the feed item and/or viewer-related features discussed above, for example. Each of the logistic regression models for generating scores 212, 214, 216, and 218 for the target feed item can accept as input the same set of features or different sets of features.

Downstream Effects Scorer

Downstream effects scorer 208 computes and outputs downstream effects score 209 that is input to second pass scorer 202. Downstream effects score 209 is computed by downstream effects scorer 208 by combining estimates of downstream effects of various different viral actions the target viewer can take on the target feed item. The estimates include like estimate 220, share estimate 222, and comment estimate 224. For example, downstream effects scorer 208 may sum the estimates 220, 222, and 224, possibly after weighting each of the estimates 220, 222, and 224 with different respective weights. The different respective weights may be determined empirically or by other means (e.g., by pairwise Pareto optimization).

Each of estimates 220, 222, and 224 can be an estimate of the downstream effects if the target feed item is presented to the target viewer in response to the target personalized feed request and the target viewer takes the respective viral action (e.g., like, share, comment) on the target feed item. For example, the estimate can be of the number of additional viral actions taken by the target viewer's first, second, and third-degree connections in the social network caused by the target viewer taking the respective viral action on the target feed item. Other estimates of downstream effects are possible, and the present invention is not limited to any particular estimate.

It should be noted, however, that regardless of how the downstream effect estimate is made by multi-objective model 200, the objective of maximizing downstream effects of a feed item selection can compete with the objective of maximizing relevance of the selection to the viewer. For example, a feed item that is especially relevant to the viewer such as a job opportunity the viewer is particularly interested in, may not be a feed item that the viewer is likely to share, comment on, or like because of the viewer's interest in not revealing his or her job search to other users in the social network.

Each of estimates 220, 222, and 224 can be generated by a respective trained log-linear regression model trained to generate the estimate given an input feature vector. The input feature vector may represent some or all of the feed item and/or viewer-related features discussed above, for example. Each of the log-linear regression models for making estimates 220, 222, and 224 can accept as input the same set of features or different sets of features.

Upstream Effects Scorer

Upstream effects scorer 210 computes and outputs upstream effects score 211 that is input to second pass scorer 202. Upstream effects score 211 is computed by upstream effects scorer 210 by combining estimates of upstream effects of various different viral actions the target viewer can take on the target feed item. The estimates include like estimate 226, share estimate 228, and comment estimate 230. For example, upstream effects scorer 210 may sum the estimates 226, 228, and 230, possibly after weighting each of the estimates 226, 228, and 230 with different respective weights. The respective weights may be determined empirically or by other means (e.g., by pairwise Pareto optimization).

Each of estimates 226, 228, and 230 can be an estimate of the upstream effects if the target feed item is presented to the target viewer in response to the target personalized feed request and the target viewer takes the respective action (e.g., like, share, comment) on the target feed item. For example, the estimate can be of the number of additional feed items the actor of the target feed item will create because the target viewer takes the respective viral action on the target feed item. Other estimates of upstream effects are possible, and the present invention is not limited to any particular estimate.

Again, it should be noted, that regardless of how the upstream effect estimate is made by multi-objective model 200, the objective of maximizing upstream effects of a feed item selection may compete with the objective of maximizing relevance of the selection to the viewer. For example, a feed item having an actor that is widely known, such as a well-known celebrity or public figure, may receive a viral action from the viewer but nonetheless may not be especially relevant to the viewer, being of only general or passing interest to the viewer.

Each of estimates 226, 228, and 230 can be generated by a respective trained log-linear regression model trained to generate the estimate given an input feature vector. The input feature vector may represent some or all of the feed item and/or viewer-related features discussed above, for example. Each of the log-linear regression models for making estimates 226, 228, and 230 may accept as input the same set of features or different sets of features.

Conclusion

The above described multi-objective model is presented for purposes of illustrating a possible a multi-objective model that may be involved in scoring candidate feed items at the second pass ranker of the multistage feed ranking system. The present invention, however, is not limited to any particular multi-objective model. In particular, the logistic regression and log-linear regression distinction is not necessary to the invention but is used to provide a framework for discussion. Instead, one skilled in the art will recognize that the present invention can be implemented with different multi-objective models using different types of machine learning models (e.g., artificial neural networks, support vector machines, gradient boosting decision trees, random forests, or a combination of machine learning models).

Example Process for Responding to Personalized Feed Requests

Figure 3:
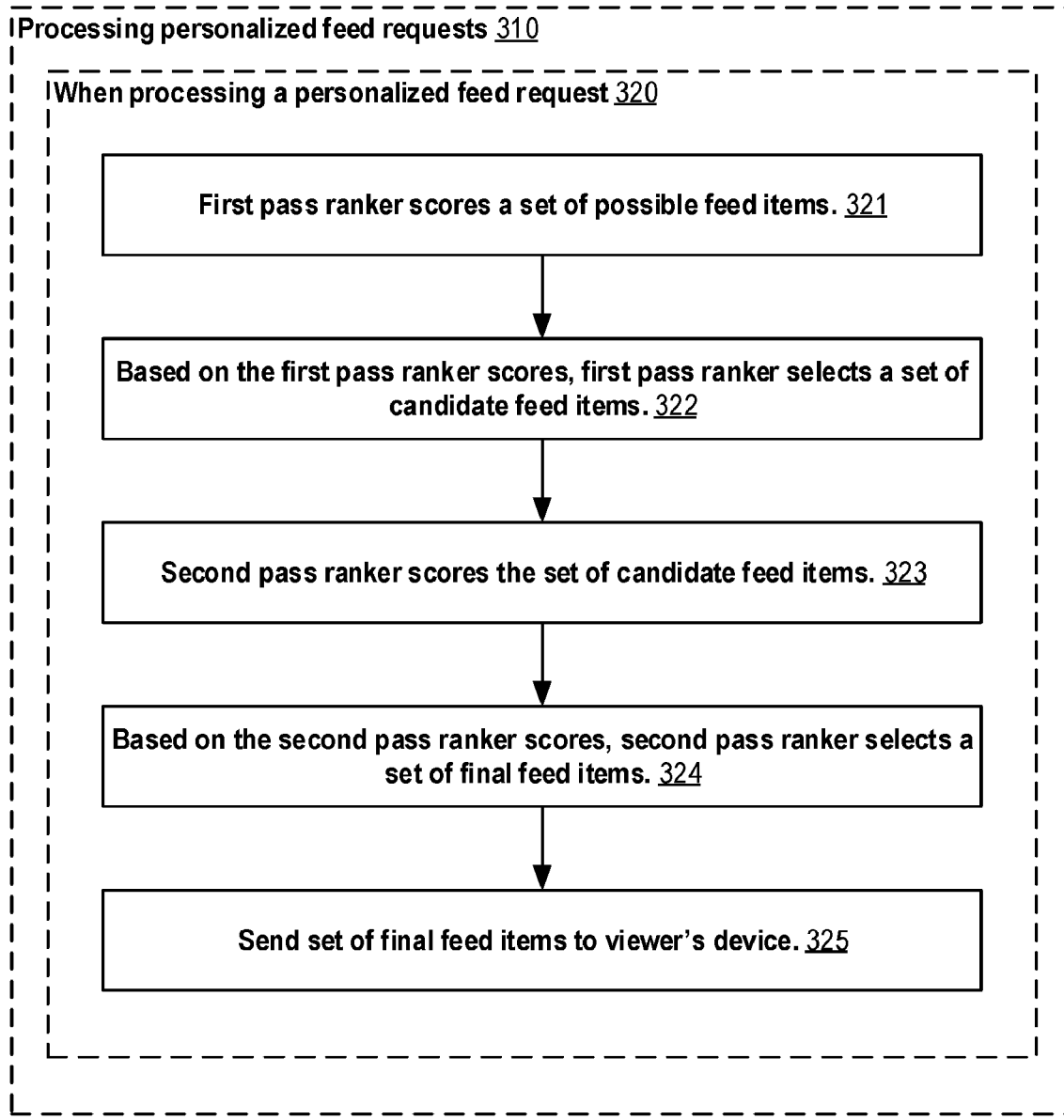
FIG. 3 is a flowchart of an example process for responding to personalized feed requests.

FIG. 3 illustrates a process 300 for responding to requests for personalized feeds in the multistage ranking system of the online service. For example, process 300 may be performed in some parts by the second pass ranker of feed service 106 and in other parts by a first pass ranker (e.g., follow feed item first pass ranker 108-3) of multistage ranking system 100 of FIG. 1 described above.

In summary, process 300 proceeds by processing 310 personalized feed requests at the multistage ranking system. The personalized feed requests processed 310 can be received from many different users and from many different user devices. For example, the personalized feed requests processed 310 can encompass personalized feed requests received at the multistage ranking system over a period of time (e.g., minutes, hours, days, weeks, or months), or a selected subset thereof (e.g., a randomly or pseudo-randomly selected percentage of all requests received during the period of time.)

For each request processed 310, processing 320 the request includes the first pass ranker scoring 321 each feed item in a set of possible feed items. Based on the scoring 321, the first pass ranker selects 322 feed items from the set of possible feed items for inclusion in a set of candidate feed items. The set of candidate feed items are provided or otherwise made available to the second pass ranker by the first pass ranker.

The second pass ranker scores 323 each feed item in the set of candidate feed items. Based on the scoring 323, the second pass ranker selects 324 feed items from the set of candidate feed items for inclusion in a set of final feed items. The set of final feed items are then sent 325 to the viewer's device for presentation to the viewer there.

For example, a user of the online service can authenticate with the online service. The user can then use a web application (e.g., a web browser application or a mobile application) at the user's personal computing device (e.g., a desktop computer or a mobile phone) to navigate to a particular web page of the online service. For example, the particular web page can be a home or default web page served to authenticated users of the online service.

Navigating to the particular web page can cause a personalized feed request to be sent to the online service. The online service can then perform steps 321-325 in context of processing the request at the multistage ranking system. A result of performing steps 321-325 can be presentation of the final set of feed items, or a subset thereof, to the user/viewer by the web application at the user's personal computing device. For example, the presentation may encompass display of a web page that presents the final set of feed items, or a subset thereof, in rank order. For example, the final set of feed items, or a subset thereof, can be presented in the web page from top to bottom where higher ranked feed items are displayed closer to the top of the web page and lower ranked feed items are displayed closer to the bottom of the web page. The rank order can be determined based on the second pass ranking scores generated by the second pass ranker for the final set of feed items.

Returning to the top of process 300, personalized feed requests are processed 310 by the multistage ranking system of the online service. As mentioned above, the personalized feed requests may be submitted by many different users from many different personal computing devices over a period of time.

Steps 321-325 are performed when processing 320 a given personalized feed request.

At step 321, the first pass ranker scores a set of possible feed items for the given request. For example, the first pass ranker may score thousands or tens of thousands of feed items or more. For each possible feed item scored by the first pass ranker for the given request, the score generated by the first pass ranker for the feed item can be logged in computer storage media for later use.

It should be noted that the exact number of possible feed items scored by the first pass ranker for a request may vary from request to request and according to the requirements of the particular implementation at hand based on various constraints such as a target latency in processing personalized feed requests. Thus, the size of the possible set is not limited to tens of thousands of feed items or any particular number of feed items.

At step 322, based on the scores computed by the first pass ranker for the set of possible feed items, the first pass ranker selects a set of candidate feed items from the set of possible feed items. For example, the first pass ranker may select the top five hundred, or so, scoring feed items from the possible set of feed items for inclusion in the candidate set of feed items.

It should be noted that the exact number of top scoring feed items selected for inclusion in the candidate set can vary from request to request and according to the requirements of the particular implementation at hand based on various constraints such as a target latency in processing personalized feed requests. Thus, the size of the candidate set is not limited to five hundred (500) feed items or any particular number of feed items. However, the number of feed items in the candidate set for a request may be significantly fewer that the number of feed items in the possible set for the request.

At step 323, the second pass ranker scores the set of candidate feed items for the given request. For each candidate feed item scored by the second pass ranker for the given request, the score generated by the second pass ranker for the feed item can be logged in computer storage media for later use, including for use in approximating recall at scale as described below.

At step 324, based on the scores computed by the second pass ranker for the set of candidate feed items, the second pass ranker selects a set of final feed items from the set of candidate feed items. For example, the second pass ranker may select the top ten to twenty, or so, scoring feed items from the candidate set of feed items for inclusion in the final set of feed items.

It should be noted that the exact number of top scoring feed items selected for inclusion in the final set can vary from request to request and according to the requirements of the particular implementation at hand based on various constraints such as, for example, a predetermined number of feed items to initial present to the viewer in response to the request. Thus, the size of the final set is not limited to ten (10) to twenty (20) feed items or any particular number of feed items. However, the number of feed items in the final set for a request may be significantly fewer that the number of feed items in the candidate set for the request.

At step 325, the set of final feed items selected 324 by the second pass ranker for the request is sent from the online service to the viewer's device for presentation in a graphical user interface (e.g., a web page) there.

Approximating Recall at Scale

The selections of feed items to present to users in personalized feeds can be vitally important to the usefulness of those feeds. Unfortunately, the feed items selections by the second pass ranker are only as good as the set of candidates provided by a first pass ranker. So, techniques are needed to evaluate the effectiveness of the first pass ranker in generating good candidates.

One way to evaluate the effectiveness of the first pass ranker in generating good candidate feed items is to measure the recall of the first pass ranker at the second pass ranker. The recall of the first pass ranker at the second pass ranker for a given personalized feed request can be measured by having the second pass ranker score all of the possible set of feed items that were scored by the first pass ranker for the request. Then, the feed items that the second pass ranker considers to be the top candidates can be compared with the feed items that the first pass ranker selected for inclusion in the candidate set. The more these two sets do not overlap (regardless of score rank order of the feed items within the sets), the worse the recall. The more these two sets overlap (again, regardless of score rank order of the feed items in the sets), the better the recall. If the second pass ranker and the first pass ranker would select the same feed items for inclusion in the candidate set irrespective of rank order, then the recall is one-hundred percent (100%), the best possible recall.

Unfortunately, the first pass ranker can score a large number of feed items in the context of a personalized feed request. Having the second pass ranker also score this large number of feed items can consume significant additional computer processor, storage, and electrical power resources. This resource usage is multiplied when computing the recall for multiple personalized search requests.

Consider an example. For each personalized feed request, a first pass ranker may score on the order of tens of thousands of feed items. A large-scale online service can serve billions of personalized feed requests per day. Even if recall is computed for only a small sample (e.g., 10%) of the daily requests, the second pass ranker could consume substantial computer processor, storage, and electrical power resources computing second pass raking scores just for a single day of requests.

Techniques disclosed herein for approximating recall at scale address these and other issues.

The techniques disclosed herein for approximating recall at scale balance the need to evaluate the first pass ranker at generating good candidates with the need to conserve computer processor, storage, and electrical power resources when computing the evaluation metric, using an approximation of recall (approximate recall).

A sample set of feed items is selected from the candidate feed items that were scored by the first pass ranker and the second pass ranker for a personalized feed request. The sample may include some or all of the candidate feed items for the request. The scores computed for the candidate set of feed items by the first and second pass rankers can be logged when processing the personalized feed request. Thus, the scores do not need to be recomputed to approximate the recall for the request. The approximate recall can be computed by comparing the top N scoring feed items of the sample computed by the first pass ranker for the request to the top N scoring feed items of the sample computed by the second pass ranker for the request, irrespective of rank order of the feed items within the top N sets. The more these top-N sets do not overlap, the worse the recall. The more these top-N sets overlap, the better the recall. If the top-N sets have the same set of feed items, then the approximate recall is one-hundred percent (100%).

According to another technique, the sample is randomly selected from the set of possible feed items that were scored by the first pass ranker for the request, to account for selection bias of the first pass ranker when it selected the candidate set for the request. With this technique, the second pass ranker may still need to compute scores for feed items in the sample set there were not included in the candidate set, which can still be substantially fewer feed items than the number of feed items in the candidate set.

Figure 4:
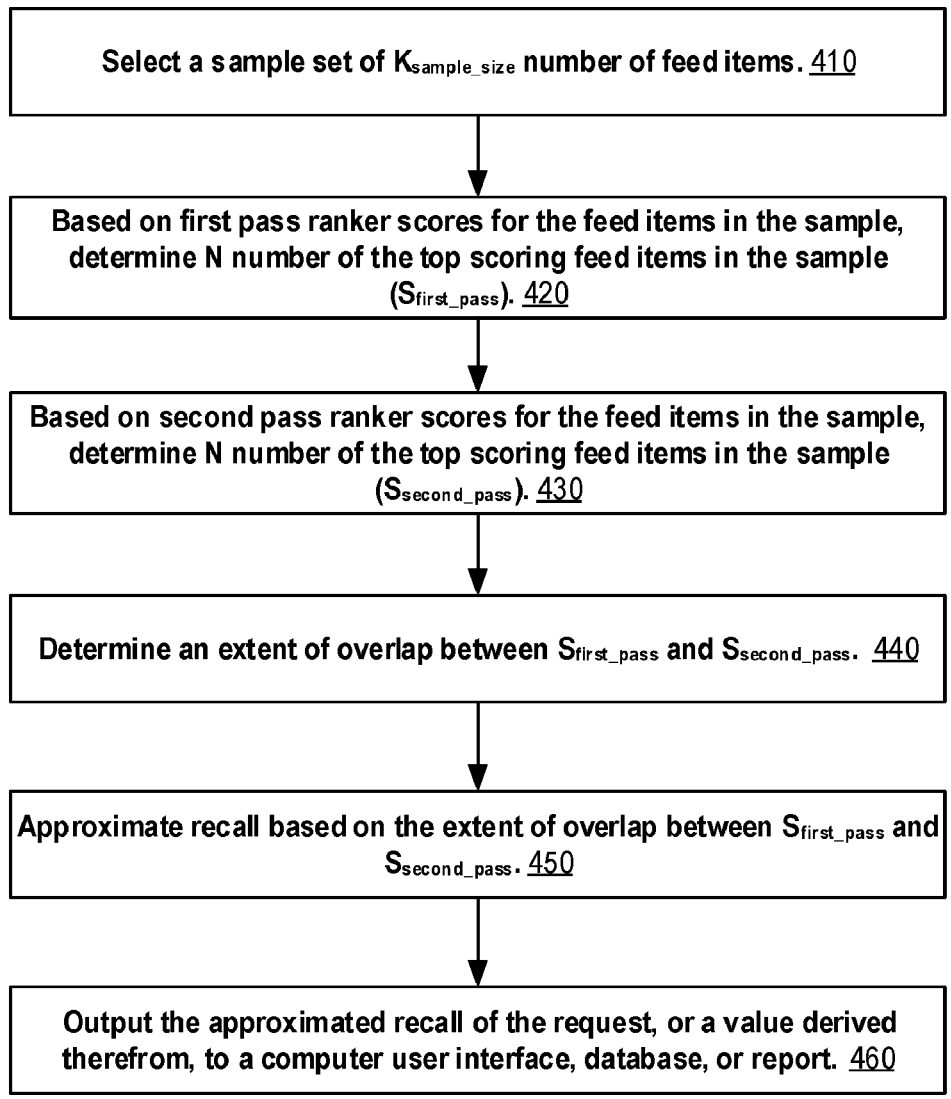
FIG. 4 is a flowchart of an example process for recall approximation at scale.

FIG. 4 illustrates example process 400 for approximating recall at the second pass ranker at scale. Process 400 can be performed by one or more computer systems after one or more computer systems perform process 300. For example, process 400 can be performed to evaluate the effectiveness of the single objective model of a first pass ranker at approximating the multi-objective model used by the second pass ranker after both the first pass ranker and the second pass ranker have processed 310 personalized feed requests. However, process 400 is not limited to this use and process 400 may be performed more generally to evaluate the effectiveness of a first pass ranker at generating good candidates for the second pass ranker in terms of recall, regardless of whether the first pass ranker uses the single objective scoring model or other feed item scoring model.

Process 400 can be performed for each of a plurality of personalized feed requests to generate an approximate recall measurement for each of the plurality of personalized feed requests. A summary statistic may be computed from the plurality of approximate recall measurements. For example, the summary statistic can an average, mean, distribution, histogram, or other useful summary statistic based on the approximate recall measurements for a plurality of personalized feed requests.

In summary, process 400 proceeds by selecting 410 sample of $K_{sample\_size}$ number of feed items scored by at least the first pass ranker for a personalized feed request. The $K_{sample\_size}$ number of feed items can be selected from either the set of possible feed items for the request and/or the set of candidate feed items for the request. Based on the first pass scores logged for the sample set of feed items, the top N scoring feed items ($S_{first\_pass}$) of the sample set according to the first pass scores computed and logged by the first pass ranker are determined 420. Based on second pass scores for the sample set of feed items, the top N scoring feed items ($S_{second\_pass}$) of the sample set are determined 430. If the sample set is selected from the set of possible feed items for the request, then the second pass ranker computes second pass scores for any feed items in the sample set that the second pass ranker did not score and log when the request was originally processed. The extent of overlap (e.g., set union) between the top N scoring feed items of the sample set according to the first pass ranker ($S_{first\_pass}$) and the top N scoring feed items of the sample set according to the second pass ranker ($S_{second\_pass}$) is determined 440. Recall of the request at the second pass ranker is approximated 450 based on the extent of overlap. The approximated recall, or a summary statistic derived therefrom, is output 460 to a computer user interface, database, or report.

Returning to the top of process 400, a sample set of $K_{sample\_size}$ number of feed items is selected 410 for a personalized feed request for which recall at the second pass ranker is being approximated. The sample set can be selected 410 from the set of possible feed items that were scored by the first pass ranker in the context of processing the request. Alternatively, the sample set can be selected 410 from the set of candidate feed items that were scored by both the first pass ranker and the second pass ranker in the context of processing the request. In either case the sample set can be selected 410 randomly, pseudo-randomly, or using stratified sampling to avoid bias. For example, the sample can be selected 410 as a sub-population based on explored feed items with positive user input signals (e.g., feed items that ultimately received a click user input action) or a sub-population of unexplored feed items. Other selection criteria can include diversity and freshness of the feed item. The diversity criteria can be based on the type of the feed items such that the sample set is representative of different types of feed items. The different types of feed items can include, for example, small entity content creators, large entity content creators, document, videos, images, articles, source language, source geographic regions, etc. The freshness of the feed item can be based on the age of the content item as measured a length of time between when the feed item was created by a content creator and a current time.

The sample set can be selected 410 from the set of possible feed items to avoid selection basis of the first pass ranker when it selected the candidate set in the context of processing the request. However, selecting 410 the sample set from the set of possible feed items can require the second pass ranker to score feed items for the purpose of approximating recall of the request. Whereas if the sample set is selected 410 from the set of candidate feed items, then the first pass ranker scores and the second pass ranker scores can be already logged and available when approximating the recall of the request without having to recompute those scores for the purpose of approximating the recall, thereby conserving computer processor, storage, and electrical power resources. It is also possible to select 410 the sample set from both the set of possible feed items and the set of candidate feed items to reduce the number of feed items that need to be scored by the second pass ranker for the purpose of approximating recall, while at the same time reducing selection bias.

The size $K_{sample\_size}$ of the sample set can vary from request to request for which recall is approximated or can be constant across requests. The number $K_{sample\_size}$ of feed items selected 410 for inclusion in the sample set can be equal to the number of feed items in the candidate set. That is, the sample set can be the candidate set, or a subset thereof. For example, $K_{sample\_size}$ can be five hundred (500), or so, assuming the number of feed items in the candidate set for the request is five hundred (500), or so.

As an alternative, the number $K_{sample\_size}$ of feed items selected 410 for inclusion in the sample set can be based on the ratio of the number of feed items in the set of possible feed items scored by the first pass ranker for the request and the number of feed items in the set of candidate feed items scored by the first and the second pass rankers for the request, so that the size $K_{sample\_size}$ of the sample set is proportional thereto. For example, if the number of feed items in the set of possible feed items is eighteen thousand (18,000) and the number of feed items in the set of candidate feed items is five hundred (500), then the number $K_{sample\_size}$ selected 410 for inclusion in the sample set can be 500/18,000*500≈14.

Other sizes of the sample set are possible and process 400 is not limited to any particular sample set size.

At operation 420, the top N scoring feed items of the sample set according to the first pass ranker ($S_{first\_pass}$) are determined 420. Regardless of whether the sample set is selected 410 from the set of possible feed items and/or the set of candidate feed items, the first pass ranking scores should be logged and available at recall approximation time without having to use the first pass ranker to recompute those scores.

The variable N can vary from request to request for which recall is approximated or can be constant across requests. In general, however, N is less than $K_{sample\_size}$. For example, the number N can also be selected based on the ratio of the number of feed items in the set of possible feed items scored by the first pass ranker for the request and the number of feed items in the set of candidate feed items scored by the first and the second pass rankers for the request, so that the number N is proportional thereto and to better approximate the recall for the request. For example, if the number of feed items in the set of possible feed items is eighteen thousand (18,000), the number of feed items in the set of candidate feed items is five hundred (500), and the size $K_{sample\_size}$ of the sample set selected 410 is five hundred (500) feed items, then the variable N can be 500/18,000*500≈14.

Other values for N less than $K_{sample\_size}$ are possible and process 400 is not limited to any particular value for $0<N<K_{sample\_size}$. However, in general, a good approximation of recall can be obtained with a relatively small sized sample set such as, for example, a sample set having a size based on the ratio the number of candidate feed items for the request over the number of possible feed items for the request.

At operation 430, the top N scoring feed items of the sample set according to the second pass ranker ($S_{second\_pass}$) are determined 430. If the sample set is selected 410 from the set of possible feed items, then the second pass ranker may have to compute second pass ranking scores for some or all of the feed items in the sample set since they may not have been computed by the second pass ranker in the context of processing the personalized feed request. On the other hand, if the sample set is selected 410 from the set of candidate feed items, then the second pass ranking scores for the feed items in the sample set should already be logged and available at recall approximation time without having to use the second pass ranker to recompute those scores.

The extent of overlap between the top N scoring feed items of the sample according to the first pass ranker ($S_{first\_pass}$) and the top N scoring feed items of the sample set according to the second pass ranker ($S^{second\_pass}$) is determined 440. This determination 440 can be made irrespective of rank order of the feed items in the sets $S_{first\_pass}$ and $S_{second\_pass}$. For example, the extent of overlap can be determined 440 as $S_{first\_pass} \cap S_{second\_pass} = S_{overlap}$ where $S_{overlap}$ includes all feed items that are in both $S_{first\_pass}$ and $S_{second\_pass}$.

Recall of the request is approximated 450 based on the extent of overlap determined 440. For example, recall can be approximated as $|S_{overlap}|/N$ such that the greater the extent of overlap between $S_{first\_pass}$ and $S_{second\_pass}$, the higher the approximated recall. If $S_{first\_pass}=S_{second\_pass}$, the approximated recall is one-hundred percent (100%).

At operation 460, the approximated 450 recall for the request, or a summary statistic derived therefrom, is output to a computer user interface, database, or report. For example, an administrator of the multistage ranking system may be presented with a graphical user interface (e.g., a web page) showing the average approximated recall, a histogram of the approximated recall, or a distribution of the approximated recall for a set of personalized feed requests. From this, the administrator can gauge approximately whether the first pass ranker is generating good quality candidates for scoring at the second pass ranking stage.

Note that while the extent of overlap can be determined 440 irrespective of rank order of the feed items in the sets $S_{first\_pass}$ and $S_{second\_pass}$ as described above, the extent of overlap can be determined 440 taking rank order of the feed items in the sets $S_{first\_pass}$ and $S_{second\_pass}$ into account. For example, some possible suitable ways to measure the overlap of the two sets taking rank order of the feed items in the sets into account can include Canberra distance, Manhattan distance, Kendall tau distance, and Fagin's version of Spearman's footrule.

Figure 5:
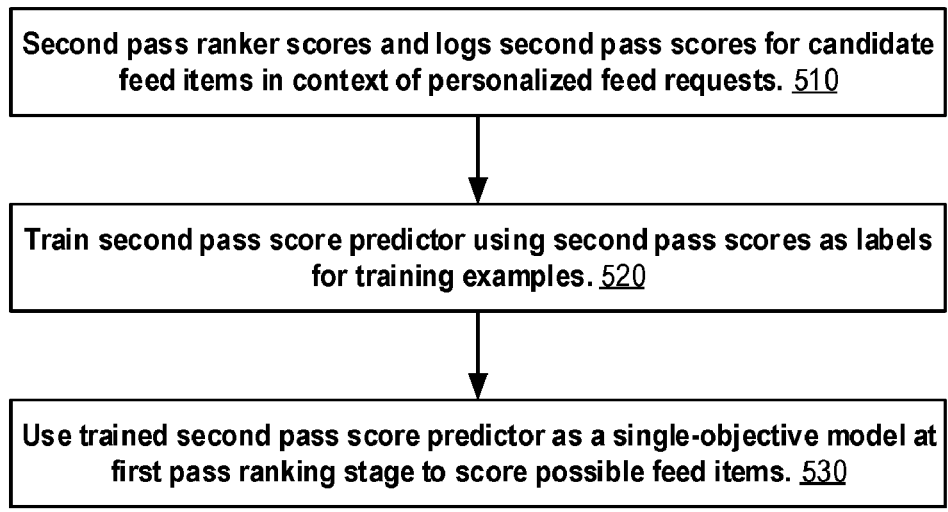
FIG. 5 is a flowchart of an example process for scalable multi-objective model approximation.

Example Processes for Approximating a
Multi-Objective Model Using a Single Stage Model FIG. 5 illustrates process 500 for approximating the multi-objective model used by the second pass ranker with the single objective model at the first pass ranker. The single objective model does not replace the multi-objective model in the multistage feed ranking system. Rather, by way of approximating the multi-objective model, the first pass ranker using the single objective model can generate good candidates for scoring by the multi-objective model at the second pass ranker without incurring the additional computing processor, storage, and electric power resources that would be consumed if the multi-objective model were used at the first pass ranking stage to score possible feed items and select candidates therefrom. This additional overhead may be required of the multi-objective model due to its greater complexity (e.g., more features and more model parameters) relative to the single objective model.

Process 500 provides a way of approximating the more complex multi-objective model in the single objective model by training a predictor of the second pass scores generated by the multi-objective model. Since the second pass scores are a combination of the multiple objectives balanced by the multi-objective model, the second pass scores can provide a useful approximation of a good candidate feed item at the first pass ranking stage.

In summary, process 500 proceeds by the second pass ranker using the multi-objective model to score candidate feed items in context of personalized feed requests and logging the second pass scores generated by the multi-objective model for the feed item scoring instances in computer storage media (510). Herein, a "feed item scoring instance" or just "feed item instance" refers to a feed item scored by a first pass ranker or the second pass ranker in context of processing a particular respective personalized feed request. After the second pass scores are logged (510), a second pass score predictor is then trained using the logged second pass scores as labels for training examples (520). The training examples used to train the second pass score predictor in operation 520 may correspond to the feed item scoring instances scored by the second pass ranker in operation 510. Once trained, the second pass score predictor is used by the first pass ranker at the first pass ranking stage as the single objective model to score and rank possible feed items in context of new personalized feed requests (530). In operation 530, the first pass ranker can use the scores for the possible feed items generated by the single objective model to select candidate feed items to provide to the second pass ranking stage in the context of the personalized feed requests. Since the single objective model approximates the multi-objective model, recall at the second pass ranking stage is improved, while reducing computer processor, storage, and electrical power resources and reducing personalized feed request processing latency.

The trained second pass score predictor can be considered a "single objective" model because it is configured to generate a score for a feed item to meet a single scoring objective—predicting the second pass score of the feed item. In contrast, the multi-objective model generates multiple individual single objective scores for an input feed item for different target objectives. The individual single objective scores are then combined into a single multi-objective score for the input feed item. For example, the multi-objective model can generate multiple scores for a feed item to meet user engagement, upstream effects, and downstream effects objectives which are then combined with weights applied to the multiple scores into a single second pass score for the feed item, as in the example multi-objective model 200 described above with respect to FIG. 2.

Returning to the top of process 500, at operation 510, the second pass ranker (e.g., feed service 106 of FIG. 1) uses the multi-objective model (e.g., model 200 of FIG. 2) to generate second pass scores for candidate feed items provided to it by the first pass ranker (e.g., 108-3) in context of processing personalized feed requests. Also, at operation 510, the second pass ranker logs the generated second pass scores for the feed item scoring instances in computer storage media. For example, operation 510 may corresponding to multiple performances by the second pass ranker of operation 323 of process 300 of FIG. 3 during processing 310 of multiple personalized feed requests.

At operation 520, a second pass predictor model is trained in a supervised learning manner. The second pass predictor model can be a linear predictor model such as a least square linear regression model, a least square linear regression model with regularization (e.g., ridge regularization), or other type of linear predictor model that encompasses a linear function of a set of coefficients and explanatory variables (e.g., feed item feature and/or viewer-related features for a feed item scoring instance), whose output value is used to predict the outcome of a dependent variable (e.g., a second pass score for the feed item scoring instance). For example, the linear predictor model can be a linear regression model with ridge or lasso regression. As an alternative to a linear predictor model, the second pass predictor can be a regression tree, K-nearest neighbor, or a neural network-based model.

The second pass predictor model is trained in a supervised learning manner to learn a mapping function from: (a) feature vectors for feed item scoring instances of operation 510 to (b) the second pass scores for those feed item scoring instances logged at operation 510. In other words, feature vectors for the feed item scoring instances are the training examples for the supervised machine learning training process and the second pass scores for those feed item scoring instances are the labels for supervised machine learning process.

Each second pass score scored and logged 510 by the second pass ranker in context of processing personalized feed requests can be scored and logged 510 by the second pass ranker for a respective feed item in the context of a respective personalized feed request from a respective viewer. Thus, each training example labeled in operation 520 with a second pass score can correspond to a feed item scoring instance for the respective feed item and in the context of the respective personalized feed request from the respective viewer processed in operation 510.

However, it should be emphasized that the feature vectors for the feed item scoring instances input to the multi-objective model at operation 510 may not be identical to the feature vectors of the training examples used to train the second pass score predictor model at operation 520. Indeed, the feature vectors for training can be a reduced or simplified feature set so as to simplify the single objective model (e.g., use fewer features and have fewer model parameters) relative to the multi-objective model and thereby consume fewer computer processor, storage, and electrical power resources when scoring feed items in context of processing personalized feed requests.

For example, the feature vector for a feed item scoring instance used as a training example in operation 520 may contain just a subset of the features that were input to the multi-objective model for the feed item scoring instance in operation 510. Or the feature vector training example can contain only feed item features (and not contain any viewer-related features). Alternatively, the feature vector training example can contain fewer feed item features and/or fewer viewer-related features than were input to the multi-objective model for the feed item scoring instance in operation 510.

Using second pass ranking scores as labels of the training examples for training the second pass predictor model can have a number of advantages. The second pass ranking score as a label can provide better alignment of the first ranking stage and the second ranking stage, thereby improving recall at the second pass ranking stage. In addition, using the second pass ranking scores as labels can be used to reduce or eliminate the dependency on viewer-related features at the first pass ranking stage when processing personalized feed requests online. This partial or complete decoupling of the single objective model from viewer-related features also allows training of the second pass predictor model to be performed more efficiently and on a larger set of training examples while consuming fewer computer processor, storage, and electrical power resources.

Second Pass Score Modifier

A score modifier can be applied to the second pass scores generated by the second pass ranker before the modified second pass scores are used as labels for the training examples in operation 520. The score modifier can help the second pass score predictor model to better learn to discriminate, when used to score possible feed items at the first ranking stage in context of processing personalized feed requests, between possible feed items that are good candidates to pass on the second pass ranker and feed items that are not as good of candidates to pass on the second pass ranker.

The score modifier can be used to provide a wider numerical margin (i.e., better discriminatory score) between (a) second pass scores for feed item instances that ultimately received positive user input actions when presented in personalized feeds and (b) second pass scores for feed item instances that did not receive any positive user input actions when presented in personalized feeds.

Positive user input actions may include click or viral user input actions taken on feed items presented to viewers in personalized feeds in response to personalized feed requests. If a presented feed item does not receive a positive user input action, then it can be considered to have received a negative user action. A negative user input action may encompass, for example, a viewer viewing or scrolling by a feed item presented in a personalized feed but deciding not to take a click user input action or a viral user input action on the presented feed item. From the perspective of the online service, if the online service does not detect any positive user input action taken on a presented feed item, then the online service can determine that the feed item received a negative user action.

As explained in greater detail below, the score modifier can also be used to provide a wider numerical margin (i.e., better discriminatory score) between (a) second pass scores for feed item instances that ultimately received click user input actions and (b) second pass scores for feed item instances that ultimately received more viral user input actions on feed items.

The ultimate user input actions (or the absence of any user input actions) taken on feed item instances scored in operation 510 may be obtained from log data that records and tracks user input actions on feed item instances presented in personalized feeds such as click-through log data or the like tracked and maintained by the online service.

Once the second pass score predictor is trained 520, then it can be used 530 to score possible feed items at the first pass ranking stage of the multistage ranking system in context of new personalized feed requests. The scores generated will be predicted second pass scores for the possible feed items. The top K (e.g., 500 or so) scoring number possible feed items for a personalized feed request can be provided to the second pass ranker as candidates for the request.

Process 500 may be performed repeatedly to periodically generate a new trained second pass score predictor model based on a more recent set of training examples.

Negative Bias Factor

For a feed item instance scored in operation 510 that ultimately did not receive a click or viral user input action (e.g., ultimately did not receive any user input action) when presented to the viewer in the personalized feed in response to the personalized feed request from the viewer, the second pass score for the feed item instance may be modified by a negative bias factor before the modified second pass score is used as a label for the training example at operation 520. For example, the negative bias factor may be such that the label of each training example for feed item instances that ultimately did not receive a click user input action and did not receive a viral user input action is the worst possible second pass score (e.g., zero). In this way, the trained second pass score predictor model is discouraged from predicting good second pass scores for feed item instances that are similar to feed item instances in the training set that ultimately did not receive a user click action or a viral click action.

Click Bias Factor

For a feed item instance scored in operation 510 that ultimately did receive a click user input action but did not receive a viral user input action when presented to the viewer in the personalized feed in response to the personalized feed request from the viewer, the second pass score for the feed item instance may be modified by a click bias factor before the modified second pass score is used as a label for the training example for the feed item scoring instance at operation 520. For example, the click bias factor may be such that the label of the training example is a modified second pass score that is a better second pass score than if the original second pass score for the feed item scoring instance were to be modified by the negative bias factor. In this way, the trained second pass score predictor model is encouraged to predict better second pass scores (relative to the negative action bias) for feed item instances that are similar to feed item instances in the training set that ultimately received a click user input action but not a viral user input action.

Viral Bias Factor

For a feed item instance scored in operation 510 that ultimately did receive a viral user input action when presented to the viewer in the personalized feed in response to the personalized feed request from the viewer, the second pass score for the feed item scoring instance may be modified by a viral bias factor before the modified second pass score is used as a label for the training example at operation 520. For example, the viral bias factor may be such that the label of a training example is a modified second pass score that is a better second pass score than if the original second pass score for the feed item scoring instance were modified by the click bias factor. In this way, the trained second pass score predictor model is encouraged to predict better second pass scores (relative to the click action bias) for feed item instances that are similar to feed item instances in the training set that ultimately received a viral user input action.

Applying the Negative, Click, and Viral Bias Factors to Training Examples

As indicated above, for a given original second pass score for a feed item instance generated in operation 510, the viral bias factor applied to the original second pass score may produce a better modified second pass score than if the click bias factor were applied to the original second pass score, and the click bias factor applied to the original second pass score may produce a better modified second pass score that if the negative bias factor were applied to the original second pass score.

A modified second pass score to be used as a label for the training example may be generated by multiplying the original second pass score by one of: negative bias factor, the click bias factor, or the viral bias factor, depending on the user input action ultimately received (or not received) by the feed item instance.

The negative bias factor can be zero (0) such that all training examples for feed item instances that ultimately did not receive a click or viral user input action are labeled with a second pass score of zero. It is also possible for the negative bias factor to be very close to zero (0) such as, for example, 0.05. However, a negative bias factor very close to zero (0) can add noise to the second pass score predictor model resulting in potentially lower click and viral user action rates when the second pass score predictor is used online to score possible feed items in context of personalized feed requests.

The click bias factor can be a fraction value (e.g., 0.20) between the negative bias factor (e.g., zero) and the viral bias factor (e.g., one) by which to multiply original score pass scores such that all training examples for feed items instances that ultimately did receive a click user input action but did not receive a viral user input action are labeled with a second pass score that is a worse second pass score than the original second pass score for the feed item instance.

The viral bias factor can be one (1) such that all training examples for feed item instances that ultimately did receive a viral user input action are labeled with their original second pass scores.

Other values of the negative bias factor, the click bias factor, and the viral bias factor are possible and process 500 is not limited to any particular set of factor values. In general, however, for a given original second pass score, if the negative bias factor is applied to the original second pass, the resulting modified second pass score should be a worse second pass score than if the click bias factor were applied to the original second pass score, which in turn should be a worse second pass score than if the viral bias factor were applied to the original second pass score.

Click-Viral Tradeoff

The click bias factor can be adjusted to bring (a) the modified second pass scores used as labels for training examples for feed item instances that ultimately received a click user input action but did not receive a viral user input action numerically closer to (b) the modified second pass scores used as labels for training examples for feed item instances that ultimately received a viral user input action.

Likewise, the click bias factor can be adjusted to create more numerical distance between the modified second pass scores involving click and viral user input actions. For example, if the viral bias factor is one (1), then a click bias factor of 0.5 would bring the labels of training examples involving click user actions but not viral user actions closer to the labels of training examples involving viral user actions than a click bias factor of 0.2 would.

Recognizing this, the click bias factor can be adjusted to meet a desired tradeoff between click user actions and viral user actions along a Pareto optimization curve. In particular, adjusting the click bias factor such that the labels for training examples involving click actions but not viral actions are generally numerically closer to the labels for training examples involving viral actions results in a trained second pass score predictor model that is more "click-biased." On the other hand, adjusting the click bias factor such that the labels for training examples involving click actions but not viral actions are generally numerically farther apart from the labels for training examples involving viral actions results in a trained second pass score predictor model that is more "viral-biased."

When a more click-biased second pass score predictor model is used at the first pass ranking stage to score possible feed items in context of personalized feed requests, then it can be expected to ultimately receive more click user input actions and fewer viral user input actions on feed items presented to viewers in personalized feeds in response to the personalized feed requests than if a more viral-biased second pass score predictor model is used. The click bias factor can adjusted up or down to achieve a desired balance between the ultimate click user input action rate and the ultimate viral user input action rate on feed items presented in personalized feeds.

As an example, the following table shows the number of ultimate click user actions and the number of ultimate viral user actions for different click bias factors along a Pareto optimization curve. For each of the different click bias factors listed in the table, a corresponding second pass score predictor is trained on a set of training examples. Each of the trained second pass score predictors are then used to score a set of feed items. In the example, the negative bias factor is zero (0) and the viral bias factor is one (1) for all three trained second pass score predictors. As can be seen from the table, as the click bias factor increases from 0.1 to 0.3 to bring labels of training examples involving click and viral user input actions closer together, the number of ultimate viral user actions decrease, and the number of ultimate click user actions increase.

TABLE 1

Adjusting Click Bias Factor

| Click Bias Factor | # of ultimate click user actions | # of ultimate viral user actions |
|---|---|---|
| 0.1 | ~36,000 | ~4,000 |
| 0.2 | ~43,000 | ~3,500 |
| 0.3 | ~46,000 | ~3,000 |

Figure 7:
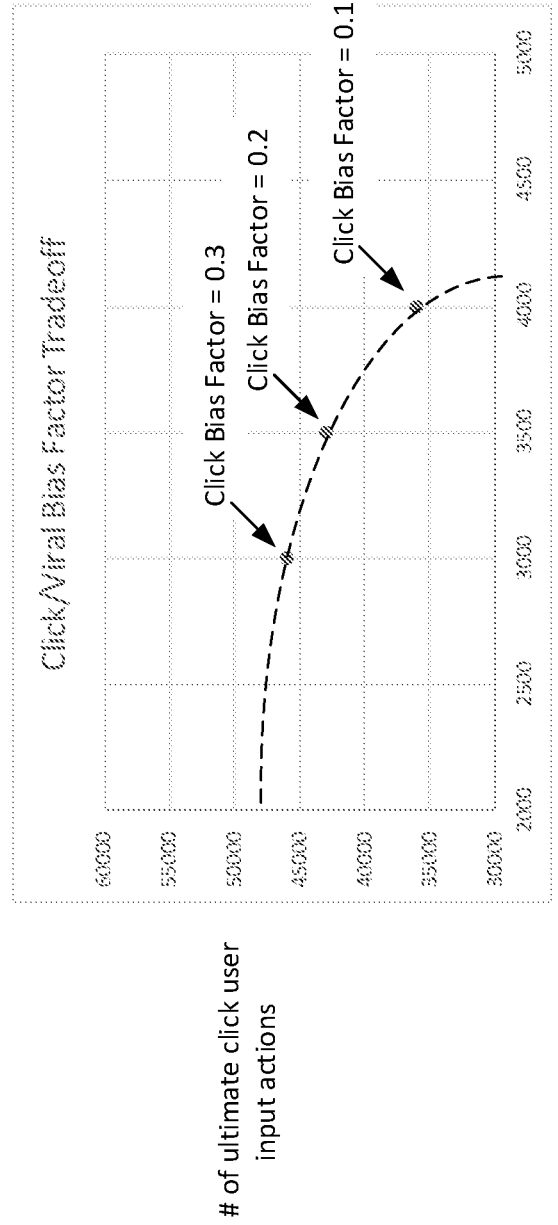
FIG. 7 is a chart of a click bias factor tradeoff between the number of ultimate click user input actions and the number of ultimate viral user input actions along a Pareto optimization curve.

FIG. 7 includes chart 700 that plots the click/viral tradeoffs of Table 1 above along a Pareto optimization curve approximated with the curved dashed line through the three points. As can be seen, as the click bias factor is decreased the number of ultimate click user actions is decreased in favor of an increased number of ultimate viral user input actions along the curve. And as the click bias factor is increased the number of ultimate click user actions is increased and the number of ultimate viral user input actions is decreased along the curve.

A possible, non-exclusive, linear cost function of the second pass score predictor model is the following linear regression cost function with a ridge regularization term for loss L:

$$L = \sum_{i=1}^{n}\left(y_i - \sum_{j=1}^{p}\beta_j \chi_{ij}\right)^2 + \lambda \sum_{j=1}^{p}\beta_j^2$$

In the above equation, the parameter $y_i$ represents the modified second pass score label for feed item instance training example $X_1$. The parameter $\beta_j$ for j=1 to p are the learned regression coefficients and $X_{ij}$ for j=1 to p are the feature representations of the features of the feed item instance training example $X_i$. The paragraph λ can be tuned according to the requirements of the particular implementation at hand via cross-validation or online learning.

Possible, non-exclusive, pseudo-code of a software-defined procedure or function for computing the label $y_i$ for a feed item instance training example $X_i$ is:

```
00:    ComputeLabel(χ_i):
01:        If UltimateResponse(χ_i) == viral:
02:            y_i = SPRScore (χ_i)
03:        ElseIf UltimateResponse(χ_i) == click:
04:            y_i = ClickBiasFactor * SPRScore(χ_i)
05:        ElseIf UltimateResponse(χ_i) == none:
06:            y_i = 0
```

Line 02 in the above-example pseudo code represents a viral bias factor of one (1) such that the label $y_i$ for feed item scoring instance training example $X_i$ is the second pass score for the feed item scoring instance assigned by the second pass ranker if the feed item ultimately received a viral user input action. Line 06 represents a negative bias factor of zero (0) such that the label $y_i$ for feed item scoring instance training example $X_i$ is zero (0) if the feed item ultimately did not receive a click or a viral user input action. Line 04 represents a click bias factor between zero (0) and one (1) such that the label $y_i$ for feed item scoring instance training example $X_i$ is the click bias factor multiplied by the second pass score for the feed item scoring instance assigned by the second pass ranker if the feed item ultimately did receive a click action but did not receive a viral action.

Logistic Regression Approach

Another approach for approximating the multi-objective model using the single objective model uses logistic regression with discriminatory weights in the entropy loss function during training. The weights discriminate between ultimate viral, click, and negative user actions on the feed item instances of the training examples. The approach uses a logistic regression model trained with binary labels for the feed item instance training examples. The trained logistic regression model can then be used by a first pass ranker to score possible feed items with good approximation of the multi-objective model.

One of the two binary labels (referred to hereinafter as a "positive label") is given to a training example if the feed item instance of the training example ultimately received a click user input action. However, click user input actions and viral user input actions are weighted differently in the entropy loss function so that the trained single objective model better approximates the multi-objective model.

The other of the two binary labels (referred to hereinafter as a "negative label") is given to a training example if the feed item instance of the training example did not receive a click user input action (e.g., received a negative user action.)

As mentioned, so that the trained single objective model better discriminates between viral user input actions from click user input actions and better approximates the multi-objective model, the training examples can be weighted differently in the logistic regression entropy loss function according to the type of user input action ultimately involved in the feed item instance training example.

The logistic regression function of the single objective model can predict the probability of a positive user input action for a given feed item. A positive user input action can be either a click user input action or a viral user input action. For example, in the context of processing a personalized feed request, the logistic regression function can generate a numerical value between zero (0) and one (1) that reflects the probability that the viewer will take a positive user input action on a given feed item if the given feed item is presented to the viewer in a personalized feed in response to the personalized feed request. For example, the following logistic regression function can be used:

$$P \text{ (positive user input action)} = \frac{1}{1+e^{-t}}, t = \sum_{j=1}^{k}\beta_j \chi_j$$

In the above equation, the parameter $\beta_j$ for j=1 to p are the learned regression coefficients and $X_j$ for j=1 to p are the feature representations of the features of the given feed item instance being scored.

With the above logistic regression function, the entropy loss function to minimize during training that uses the differential weights and that includes a regularization term can be:

$$L = -\sum_{i=1}^{n}w_i(y_i\log(p_i) + (1-y_i)\log(1-p_i))$$

In the above equation, the parameter $y_i$ represents the label for feed item instance training example $x_i$. The parameter $p_i$ represents a predicted probability of a positive user input action for feed item instance training example $X_i$ according to the foregoing logistic regression function above. The parameter $w_i$ represents the weight for feed item instance training example $X_i$ that depends on whether the feed item instance ultimately involved a positive user input action and, if so, whether the feed item instance ultimately involved a click user input action or a viral user input action.

The weight $w_i$ for feed item instance training example $X_i$ can be higher for a training example ultimately involving a viral user input action than the weight for a training example ultimately involving a click user input action. By boosting weights for viral actions, the single objective model can more closely approximate the multi-objective model which can favor at the second pass ranking stage feed item instances that are more likely to receive a viral click user input action over feed item instances that are less likely to receive a viral click user input action because of downstream effects resulting from viral user input actions.

Possible, non-exclusive, pseudo-code of a software-defined procedure or function for computing the loss function weight $w_i$ and determining the label $y_i$ for a feed item instance training example $X_i$ for training the logistic regression model is:

```
00:   ComputeWeight (χ_i):
01:      If UltimateResponse(χ_i) == viral:
02:         w_i = 10, y_i = 1
03:      ElseIf UltimateResponse(χ_i) == click:
04:         w_i = 2, y_i = 1
05:      ElseIf UltimateResponse(χ_i) == none:
06:         w_i = 1, y_i = 0
```

Line 02 in the above-example pseudo code represents a weight $w_i$ of ten (10) and a positive label $y_i$ of one (1) if the feed item instance training example $X_i$ ultimately received a viral user input action. Line 06 represents a weight $w_i$ of one (1) and a negative label $y_i$ of zero (0) if the feed item instance training example $X_i$ ultimately did not receive a click or a viral user input action. Line 06 represents a weight $w_i$ of two (2) and a positive label $y_i$ of zero (1) if the feed item instance training example $X_i$ ultimately did receive a click user input action but did not receive a viral user input action.

While the above approach is described in the context of a logistic regression model, one skilled in the art will recognize that the use of differential weights in a loss function as described above can be applied to other types of machine learning models such as, for example, gradient boosted decision trees, multi-layer perceptrons, neural network models, or a combination of linear and non-linear models (e.g., a linear mixed model).

Click-Viral Tradeoff for Logistic Regression Approach

Like with adjusting the click bias factor above with regard to the second pass predictor model, the numerical distance between the weight assigned for a viral user input action (e.g., 10) and the weight assigned for a click user input action (e.g., 2) when training the logistic regression model can reflect a desired tradeoff between ultimate click user input actions and ultimate viral user input actions along a Pareto optimization curve. If the single objective model is trained with a larger distance between the viral and click weights, the trained single objective model may cause the number of ultimate viral user input actions to increase and the number of ultimate click user input actions to decrease. On the other hand, if the single objective model is trained with a smaller distance between the viral and click weights, the trained single objective model may cause the number of ultimate viral user input actions to decrease and the number of ultimate click user input actions to increase.

As an example, the following table shows the number of ultimate click user input actions and the number of ultimate viral user input actions along a Pareto optimization curve for different weights used for viral user input actions in the entropy loss function during logistic regression model training. Here, the weight used in the loss function for a click user input action is two (2) and the weight used in the loss function for negative user action is one (1). However, these weights can be vary from implementation to implementation and the following table is provided to illustrate by example how increasing or decreasing the numerical distance between the weight used for virtual user input actions and the weight used for click user input actions can achieve a desired tradeoff between ultimate click user input actions and ultimate viral user input actions along a Pareto optimization curve when the trained logistic regression model is used to score feed items in the context of processing personalized feed requests.

For each of the different viral user input action weights listed in the table, a corresponding logistic regression model is trained on a set of training examples. Each of the trained logistic regression models are then used to score a set of feed items in the context of processing personalized feed requests and ultimate user input actions tracked. As can be seen from the table, as the viral user input weight increases from 10 (5 times click user input weight), to 16 (8 times click user input weight), to 22 (11 times click user input weight), the number of ultimate viral user actions increases, and the number of ultimate click user actions decrease.

TABLE 2

Adjusting Viral User Input Action Weight

| Viral Weight | # of ultimate click user actions | # of ultimate viral user actions |
|---|---|---|
| 10 (5× click weight) | ~57,000 | ~4,500 |
| 16 (8× click weight) | ~51,000 | ~5,000 |
| 22 (11× click weight) | ~47,000 | ~6,000 |

Figure 8:
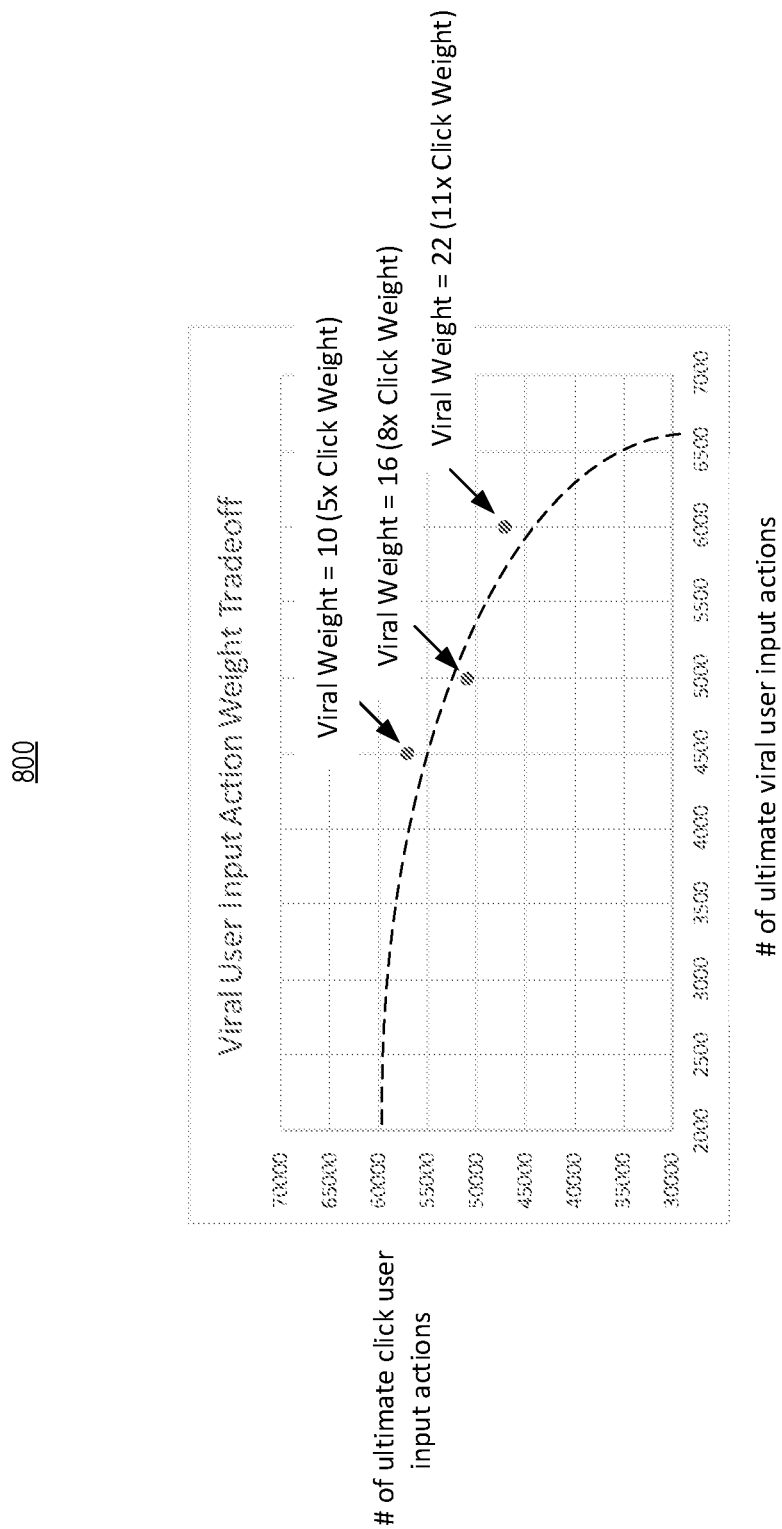
FIG. 8 is a chart of a viral user input weight tradeoff between the number of ultimate click user input actions and the number of ultimate viral user input actions along a Pareto optimization curve.

FIG. 8 includes chart 800 that plots the click/viral tradeoffs of Table 2 above along a Pareto optimization curve approximated with the curved dashed line through the three points. As can be seen, as the viral user input action weight is increased the number of ultimate click user actions is decreased in favor of an increased number of ultimate viral user input actions along the curve. And as the viral user input action weight is decreased the number of ultimate click user actions is increased and the number of ultimate viral user input actions is decreased along the curve.

While the above example tradeoff is between click user input actions and viral user input actions, one skilled in the art will recognize that similar tradeoffs can be made with respect to pairs of other types of user actions. For example, a similar tradeoff can be made between viral user input actions and dwell time user actions, and between click user input actions and dwell time user actions.

In some implementations, the click user input action weight is set to be 2 times more than negative user action weight and the viral user input action weight is set to be more than five times, eight times, or twelve times more than the user input action weight. Increasing the viral user action weight moves it along the click and viral tradeoff curve. In some implementations, a ~64% increase in ultimate click user input actions and a ~42% increase in viral user input actions for a viral user input action weight of 10 for a logistic regression model as compared to a baseline model was realized.

Online A/B test results of various models are in Table 3. The first row is the baseline model. Last row "multi-objective" is the model used by the second pass ranker. As can be seen from the table, for a particular implementation, the logistic regression approached described above using a viral user input action weight of 16 (8× the click user input action weight) most closely approximates the multi-objective model in terms of the ratio of click user input actions to viral user input actions compared to the other listed models.

TABLE 3

Offline results - click rewards and viral rewards as a percentage from a baseline model:

| Model name | Click % | Viral % |
| --- | --- | --- |
| baseline | 0.00 | 0.00 |
| linear-click-0.1 | 47.93 | 37.62 |
| linear-click-0.2 | 55.55 | 35.65 |
| linear-click-0.3 | 59.03 | 32.96 |
| linear-click-neg-0.05 | 52.63 | 31.57 |
| logistic-viral-weight-10 | 64.15 | 42.33 |
| logistic-viral-weight-16 | 70.26 | 40.01 |
| multi-objective | 70.57 | 41.58 |

Scoring Model Optimization for Scaling

The features used by a feed item scoring model (e.g., the single objective model or the multi-objective model) to score feed item instances can affect how efficiently those scores are computed. Consider an example where a logistic regression model used as the single objective model to predict the possibility of a positive user input action, or a logistic regression model used to predict one of the probabilities 212, 214, 216, 218, 220, 222, or 224 of the multi-objective model, uses features that are not all equally important to the prediction. For example, some of the features can be linearly correlated to others. In this case, the feed item scoring model can consume more computing resources than is desired to compute a satisfactorily accurate score.

Conventional approaches for determining which features to use and which features to not use as input to a model revolve around measurements of the importance of a feature to the model's prediction. A feature importance metric can measure the predictive power of a feature. For example, a feature importance score can indicate that a particular feature is really useful for the model's prediction. In this case, a data analyst might try to train the model using only that one feature dropping other less important features to see how well the model performs on a validation set using only that one feature. The analyst might ultimately decide to train the model on a few features including the particular feature but nonetheless with a fewer number of features than the original number of features and yet achieve a prediction accuracy that is close to, as good, or better than the model trained on the original set of features. With the feature importance measurements and analysis, the analysis is able to reduce the number of features needed to make accurate predictions.

Feature importance metrics can be classified into two different types: model specific metrics and model independent metrics.

Model specific metrics are available the estimate the relative contribution of a feature to a model's prediction for a particular type of model. For example, for linear models such as linear regression models, the absolute value of the t-statistic for each model parameter can be used. As another example, for a random forest, the prediction accuracy on the out-of-bag portion of the data can be recorded. The same can be done after permuting each feature. The different between the two accuracies can then be averaged over all trees, and normalized by the standard error. For random forest regression, the mean squared error can be computed on the out-of-bag data for each tree, and then the same can be computed after permuting a feature. The differences can then be averaged and normalized by the standard error.

Model independent metrics can estimate the important of each feature individually using a filter approach. For binary classification model, a receiver operating characteristic (ROC) curve analysis can be conducted on a feature. For multi-class classification, area under the ROC curve can be calculated for each class pair and the maximum area under the curve across the relevant pair-wise area under the ROC curve can be used as the feature importance measure. For regression, a linear model can be fit and the absolute value of the t-value for the slope of the feature can be used as the feature importance measure. Alternatively, a loess smoother can be fit between the prediction and the feature. Then, the R-squared statistic can be calculated against the intercept only null model. The statistic can be used as a relative measure of feature importance.

The above are just some non-limiting examples of feature importance metrics and other types of feature importance metrics are possible for different types of models and according to the requirements of the particular implementation at hand.

Feature importance metrics are well-suited for determining which features are most important to the model's prediction accuracy. However, not all features have equal cost of use. In particular, some features may consume more computing resources (e.g., CPU and memory) than other features when used by a model to make a prediction. As a result, in the context of the multistage ranking system, the online service may need to provision extra computing resources (e.g., more servers or replace servers with servers having more CPU and memory headroom) in order to use certain resource-intensive features at the first pass ranker or the second pass ranker. For a large-scale online service that processes many personalized feed requests concurrently, this can be expensive in terms of both the cost of the additional computing hardware and the extra energy costs to keep the server machines at the proper operating temperature. Thus, selecting the features to use with a model that provide the best prediction accuracy may not be cost-effective.

Techniques disclosed herein address this and other issues.

Limiting Expensive Features

Figure 6:
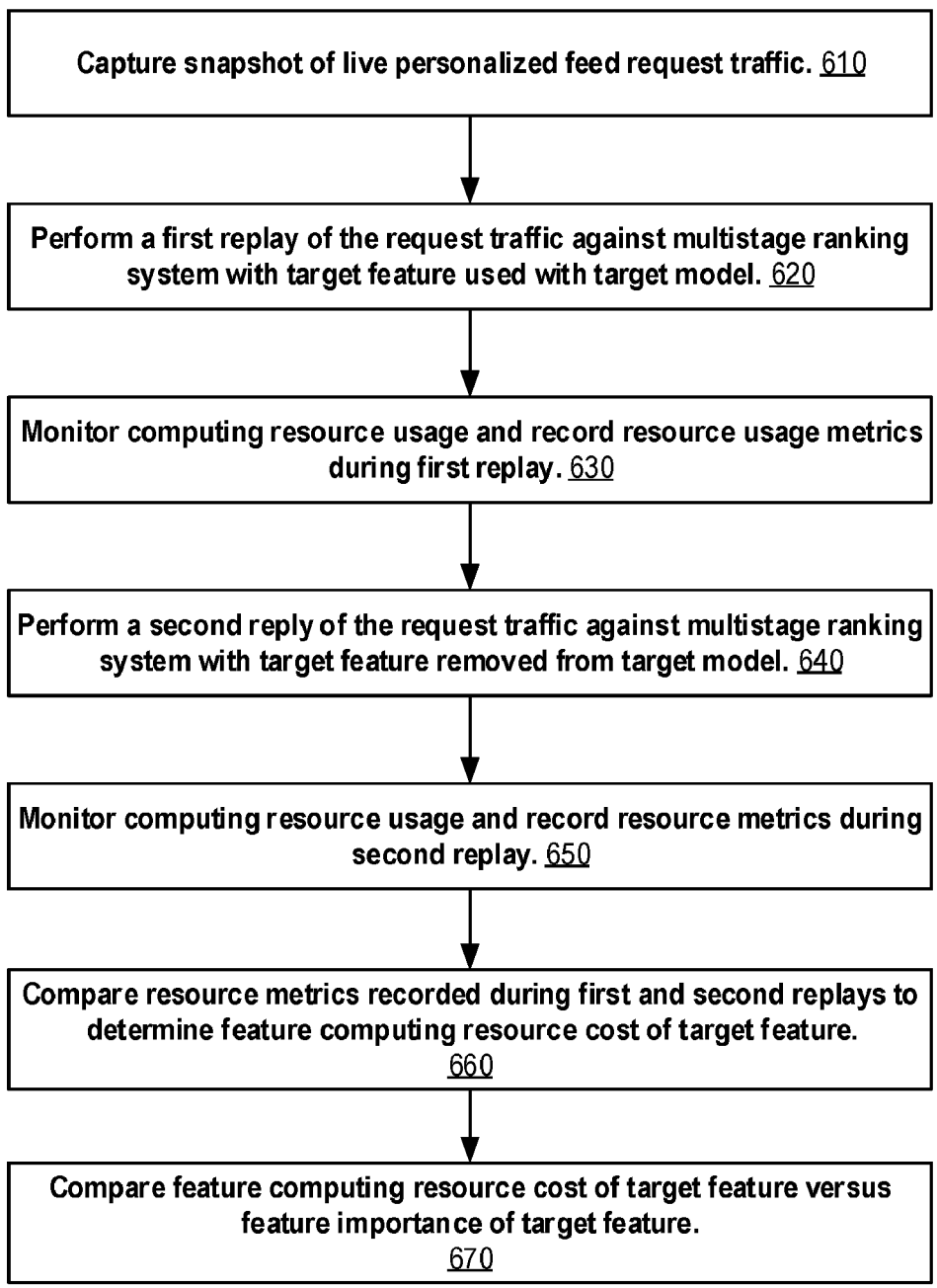
FIG. 6 is a flowchart of an example process for feed item scoring model optimization for scaling.

FIG. 6 illustrates example process 600 for limiting use of expensive features by a target model used by a first pass ranker or the second pass ranker of the multi-stage ranking system. Process 600 may be performed to determine a feature computing resource cost of a target feature. Based on the target feature's feature importance measure and the target feature's feature computing resource cost, a determination can be made whether to include the feature in the target model, or whether to omit it from the target model. For example, a target feature that has strong predictive power as reflected by its feature importance measure but also has a high feature computing resource cost may nevertheless be omitted from the target model if there are a number of other features with lower feature computing resource costs that together provide a good approximation of the predictive power of the high resource cost target feature. The target model can be, for example, the linear regression model or the logistic regression model used as the single objective model to predict the possibility of a positive user input action as described above, or a logistic regression model used to predict one of the probabilities 212, 214, 216, 218, 220, 222, or 224 of the multi-objective model as described above, or another trained machine learning model used by a first pass ranker or the second pass ranker.

In summary, process 600 begins by capturing 610 a snapshot of live personalized feed request traffic. A first replay of the captured 610 request traffic is performed 620 against a test feed ranking system where the target model uses a target feature under test. During the first replay 620, computing resource usage such as CPU usage by the test feed ranking system is monitored 630 and computing resource usage metrics reflecting such computing resource usage during the first replay are recorded 630. Then a second replay of the captured 610 request traffic is performed 640 against the test feed ranking system where the target feature under test is removed from the target model. During the second replay 640, computing resource usage by the test feed ranking system is monitored 650 and computing resource usage metrics reflecting such computing resource usage during the second replay are recorded 650. After the second replay, computing resource metrics recorded 630 and 650 during the first and second replays are compared 660 to determine the target feature's feature computing resource cost. The target feature's feature computing resource cost can be compared 670 to the target feature's feature importance to determine whether the tradeoff between feature importance and feature computing resource cost is acceptable. For example, features that have a relatively high feature computing resource cost and have relatively low feature importance can be omitted from the target model when used in the production multistage feed ranking system. As another example, features that have an extremely high feature computing resource cost can be omitted from the target model when used in production even if the features have relatively high feature importance, thereby conserving computing resource consumption.

Returning again to the top of process 600, a snapshot of live personalized feed request traffic is captured 610. For example, some or all of the personalized feed requests received at a production multistage feed ranking system over a period of time may be captured 610. Capturing a personalized feed request can involve storing a representation of the request in computer storage media along with a time indicating when the request was sent or received. For example, the representation can be of the HTTP/S request(s) that make up the personalized feed request, along with any associated metadata needed to replay the request(s) at steps 630 and 650.

At operation 620, some or all of the personalized feed request traffic captured 610 is replayed against a test feed ranking system. The test feed ranking system can be a replica of the production feed ranking system in terms of computer hardware capabilities. However, an exact replica is not required as a primary purpose of using the test feed ranking system for the replay instead of the production feed ranking system is to avoid overburdening the computer hardware resources that serve live personalized feed request traffic from real end-users.

For the first replay 620, the target model uses the target feature under test. That is, the target model is trained with training examples that incorporate the target feature. During the first replay, the target model trained using the target feature (and possibly other features) is used generate predictions (e.g., feed item scores). When generating the predictions, the trained target model accepts the target feature as input for sample items (e.g., feed item instances) to be scored.

During the first replay, computing resource usage of the target multistage feed ranking system is monitored 630 and computing resource usage metrics reflecting the monitored resource usage are recorded 630 in computer storage media. A variety of different computing resource usage can be monitored using known monitoring tools. Some possible computing resources of the test multistage feed system that can be monitored 650 include, but are not limited to, CPU utilization of the computer system(s) that execute the target model, memory utilization of the computer system(s) that execute the target model, time spent garbage collecting (e.g., as might be done by a Java virtual machine that executes the target model), time spent serializing and/or deserializing network message payloads by processes executing at the computer system(s) that execute the target model, etc. A variety of different computing resource metrics can be recorded using known monitoring and metric generation tools. Some possible computing resource metrics of the target multistage feed ranking system that can be recorded 650 include, but are not limited, to CPU utilization metrics, memory utilization metrics, thread pool utilization metrics, garbage collection metrics, network message serialization/deserialization metrics, p99 latency metrics, etc.

At operation 640, the request traffic replayed at operation 620 is replayed 640 again against the test feed ranking system. This time, however, the target model does not use the target feature under test. That is, the target model is trained with training examples that do not incorporate the target feature. During the second replay, the target model trained without the target feature (but with one or more other features) is used generate predictions (e.g., feed item scores). When generating the predictions, the trained target model does not accept the target feature as input for sample items (e.g., feed item instances) to be scored.

During the second replay, computing resource usage of the target multistage feed ranking system is monitored 650 and computing resource usage metrics reflecting the monitored resource usage are recorded 650 in computer storage media. The same computing resources monitored at operation 630 in context of the first replay can be monitored at operation 650 in context of the second replay. And the same computing resource metrics recorded at operation 630 in context of the first replay can be recorded at operation 650 in context of the second replay.

At operation 660, the computing resource metrics recorded at operation 630 and operation 650 are compared to determine the feature computing resource cost of the target feature. The feature computing resource cost of the target feature versus the feature importance of the target feature can then be compared 670 to determine if the target feature should or should not be used in the target model. For example, by removing a single feature from the target model, a reduction (e.g., 7%) in CPU utilization and a reduction (e.g., 12%) in p99 latency might be realized for a relatively unimportant feature.

It should be noted that while process 600 is performed to determine the feature computing resource cost of a target feature, another process could be performed to determine computing resource cost of a target modeling technique. In this case, an online production A/B test can be conducted using a baseline modeling technique for a target model as the control of the A/B test and using an alternative "target" modeling technique for the target model as the experiment of the A/B test. For example, the baseline modeling technique can be using a logistic regression model to generate feed item scores and the alternative target modeling technique can be using a gradient boosted tree ensemble to generate features that are fed along with other features into a logistic regression model to generate feed item scores. As another example, the baseline modeling technique can be the alternative modeling technique in the previous example involving a gradient boosted tree ensemble and a logistic regression model and the alternative target modeling technique can be using a gradient boosted tree ensemble to generate features that are the only features fed into a logistic regression model to generate feed item scores. As yet another example, the baseline modeling technique can be the alternative modeling technique in the prior example and the alternative target modeling technique can be using only a gradient boosted tree ensemble to generate feed item scores without using a logistic regression model.

The importance of the target modeling technique can be measured variously. For example, the importance of the target modeling technique can be measured as the difference between (a) the number or rate of viral user input actions on feed items presented in personalized feeds generated based on the baseline modeling technique and (b) the number or rate of viral user input actions on feed items presented in personalized feeds generated based on the alternative target modeling technique. An increase in the number or rate of viral user input actions from the baseline to the alternative technique can indicate that the alternative technique is relatively more important to the feed item score accuracy than the baseline technique. On the other hand, a decrease can indicate relatively less importance of the alternative technique.

The computing resource cost of the modeling techniques can be measured by monitoring the computing resource usage of the baseline and alternative techniques under the A/B test. For example, the resource usage and metrics monitored and recorded for a target model with and without a target feature as in operations 630 and 650 discussed above can be monitored and recorded for the baseline and the alternative techniques.

The combination of an importance measurement and computing resource cost of an alternative modeling technique can be evaluated to determine whether the alternative modeling technique should replace the baseline technique in production. For example, an alternative technique that has a better importance measurement than the baseline technique may replace the baseline technique if the computing resource cost is less than, the same, or perhaps even only slight worse than the baseline technique. However, it may be determined not to replace the baseline technique with the alternative technique even if the alternative technique has a better importance measurement if it also has significantly higher computing resource cost.

Alternative Approaches

In an implementation, leaves of a gradient boosted tree model are used to capture the interactions amongst viewer features, feed item features, viewer-feed item features, viewer-actor features, viewer-actor-feed item features, and global features. This model is shown in FIG. 9.

Figure 9:
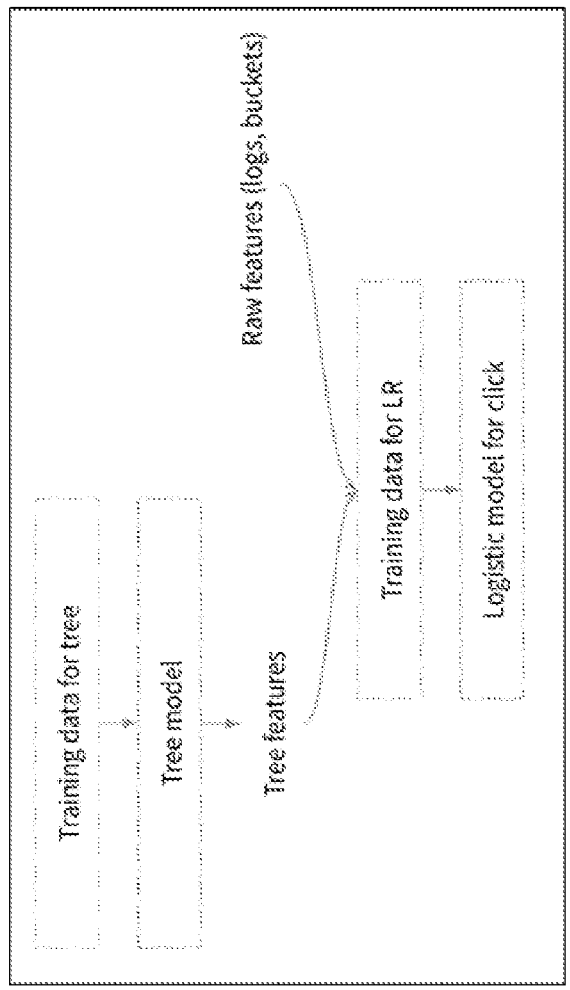
FIG. 9 depicts an alternative machine learning model for use at a first pass ranker for scoring feed item instances.

In the model of FIG. 9, a click and viral ensemble is used with separate xgboost trees each as input to a logistic regression model. These add linearly to the compute footprint of the first pass model. To reduce two ensembles to one, the differential weighting technique disclosed above can be used while training the click ensemble alone. This combined ensemble can help reduce the number of decision trees by half while keeping recall metrics almost constant.

Figure 10:
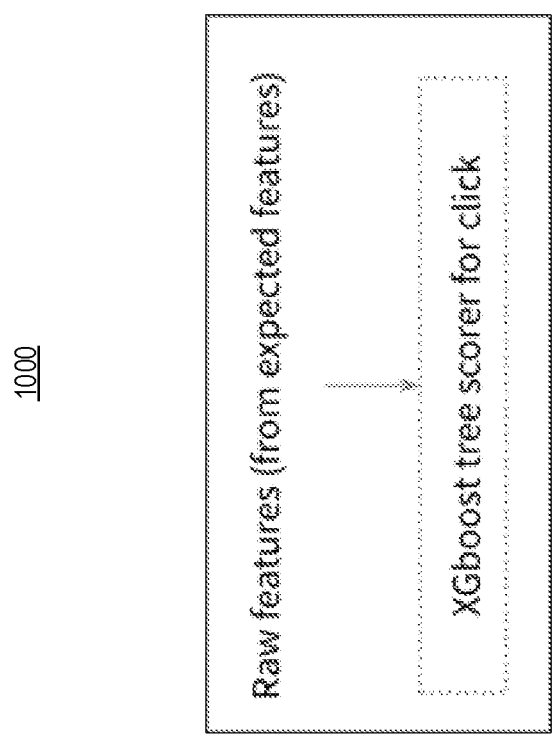
FIG. 10 depicts an alternative machine learning model for use at a first pass ranker for scoring feed item instances.

FIG. 10 presents another alternative model that uses gradient decision boosted trees trained with differential weights for feed item scoring but does not use a logistic regression model and does not use manual feature bucketing and transformations.

Table 4 below list some alternative models and their performance and efficacy relative to a baseline model for a particular implementation. The tree+LR model corresponds to the model depicted in FIG. 9. The tree-only+LR model corresponds to the model of FIG. 9 but not using the raw/manual feature bucketing and transformations. The tree-scorer model corresponds to the model of FIG. 10. As can be seen, all non-baseline models perform about the same in terms of efficacy (viral uniques % and DUC %). However, the tree-scorer model reduces personalize feed request processing latency with only minimal increase in processor footprint.

| Model architecture | Description | Performance % | | Online results % | |
| --- | --- | --- | --- | --- | --- |
| | | CPU % | p99 latency % | Viral uniques % | DUC % |
| Baseline | Click based logistic regression using legacy features | 0.00 | 0.00 | 0 | 0 |
| tree + LR | Tree as interaction features along with other features to the viral-weighted-click Logistic regression | 47.07 | 84.54 | 0.89% | 0.62% |
| tree-only + LR | Similar to above but using only tree as features to the LR | 28.93 | 30.66 | 1.44% | 0.70% |
| tree-scorer | Using only trees for scoring and removing LR layer. No manual transformations. | 10.55 | −10.65 | 1.49% | 0.68% |

Removing Manual Feature Interactions and Transformations

A logistic regression model can contain bucketing and logarithmic transformations of real valued features, as well as manual feature interactions created via data analyses. Unfortunately, these historical transformations and interactions can lead to significant runtime complexity through many code paths. To understand each transformer's granular impact, a java profiler can be used to trace a model during scoring to monitor java bytecode constructs and operation time at the JVM level. The profiler can calculate total time at garbage collection, total scoring time, and time taken at each Java class. Utilizing the machine-learned bucketing and feature interactions via the tree ensemble alone can be used as inputs to a logistic regression model. A sufficiently large and deep forest, along with highly optimized scoring code, can replicate the individual transformers with a smaller footprint.

Using only gradient decision boosted tree leaves as proxy for interacted features can reduce the process time (e.g., by 12% over baseline) and latency (e.g., by 29%) (model tree-only+LR in Table 4 above) compared to the full model (tree+LR in table 4 above). Moreover, Table 4 above contains A/B results of model tree-only+LR which was overall positive—it had an increase in viral actions and uniques, no change in interaction uniques, and an acceptable decrease in interactions.

Gradient Boosted Decision Tree Model

As gradient-boosted trees are powerful models themselves, using trees alone, without logistic regression as final layer, can be used to predict re-weighted click objective. In an implementation, this tree scorer model reduced CPU time further by 14% and p99 by 32% while keeping the predictive power mostly constant. The tree-scorer model was only 10% more expensive in CPU than the legacy production model (m072) and 10% lower in p99 latency while providing almost identical metric lift as a multi-objective model.

Figure 11:
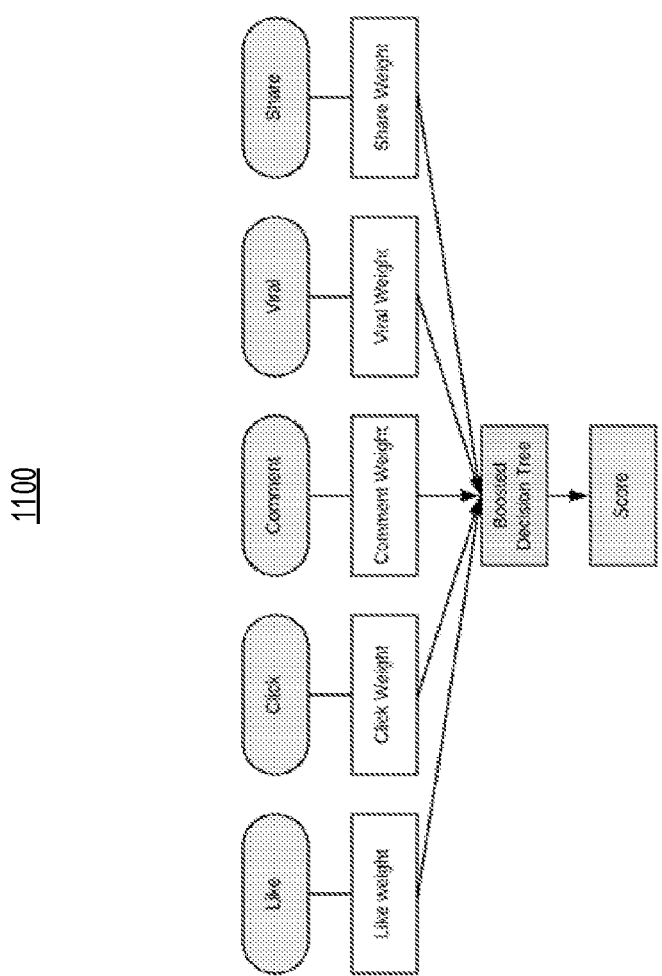
FIG. 11 depicts an alternative machine learning model for use at a first pass ranker for scoring feed item instances.

FIG. 11 depicts a gradient-boosted decision tree model for use at a first pass ranker to score feed item instances.

Computing System Implementation

An implementation of the present invention may encompass performance of a method by a computing system having one or more processors and storage media. The one or more processors and the storage media may be provided by one or more computer systems. An example computer system is described below with respect to FIG. 12. The storage media of the computing system may store one or more computer programs. The one or more programs may include instructions configured to perform the method. The instructions may be executed by the one or more processors to cause the computing system to perform the method.

An implementation of the present invention may encompass one or more non-transitory computer-readable media. The one or more non-transitory computer-readable media may store the one or more computer programs that include the instructions which, when executed by one or more processors of a computing system, are capable of causing the computing system to perform the method.

An implementation of the present invention may encompass the computing system having the one or more processors and the storage media storing the one or more computer programs that include the instructions configured to perform the method.

An implementation of the present invention may encompass one or more virtual machines that operate on top of one or more computer systems and emulate virtual hardware. A virtual machine can be a Type-1 or Type-2 hypervisor, for example. Operating system virtualization using containers is also possible instead of, or in conjunction with, hardware virtualization using hypervisors.

For an implementation that encompasses multiple computer systems, the computer systems may be arranged in a distributed, parallel, clustered or other suitable multi-node computing configuration in which computer systems are continuously, periodically, or intermittently interconnected by one or more data communications networks (e.g., one or more internet protocol (IP) networks.) Further, it need not be the case that the set of computer systems that execute the instructions be the same set of computer systems that provide the storage media storing the one or more computer programs, and the sets may only partially overlap or may be mutually exclusive. For example, one set of computer systems may store the one or more computer programs from which another, different set of computer systems downloads the one or more computer programs and executes the instructions thereof.

Figure 12:
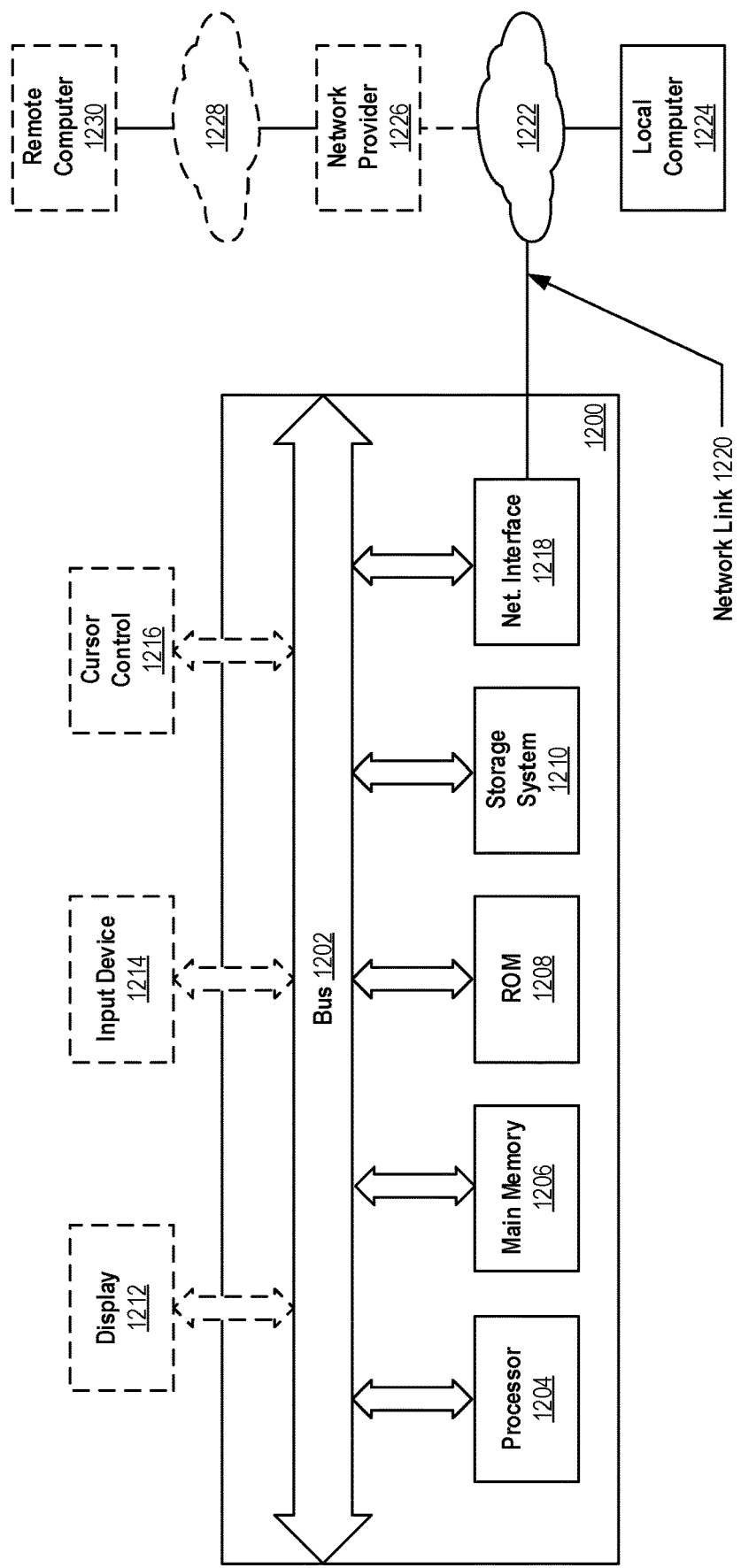
FIG. 12 is a block diagram of a computer system that can be used in a computing system implementation of the present invention.

FIG. 12 is a block diagram of example computer system 1200 used in an implementation of the present invention. Computer system 1200 includes bus 1202 or other communication mechanism for communicating information, and one or more hardware processors coupled with bus 1202 for processing information.

Hardware processor 1204 may be, for example, a general-purpose microprocessor, a central processing unit (CPU) or a core thereof, a graphics processing unit (GPU), or a system on a chip (SoC).

Computer system 1200 also includes a main memory 1206, typically implemented by one or more volatile memory devices, coupled to bus 1202 for storing information and instructions to be executed by processor 1204. Main memory 1206 also may be used for storing temporary variables or other intermediate information during execution of instructions by processor 1204.

Computer system 1200 may also include read-only memory (ROM) 1208 or other static storage device coupled to bus 1202 for storing static information and instructions for processor 1204.

A storage system 1210, typically implemented by one or more non-volatile memory devices, is provided and coupled to bus 1202 for storing information and instructions.

Computer system 1200 may be coupled via bus 1202 to display 1212, such as a liquid crystal display (LCD), a light emitting diode (LED) display, or a cathode ray tube (CRT), for displaying information to a computer user. Display 1212 may be combined with a touch sensitive surface to form a touch screen display. The touch sensitive surface may be an input device for communicating information including direction information and command selections to processor 1204 and for controlling cursor movement on display 1212 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 1214, including alphanumeric and other keys, may be coupled to bus 1202 for communicating information and command selections to processor 1204.

Another type of user input device may be cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Instructions, when stored in non-transitory storage media accessible to processor 1204, such as, for example, main memory 1206 or storage system 1210, render computer system 1200 into a special-purpose machine that is customized to perform the operations specified in the instructions. Alternatively, customized hard-wired logic, one or more ASICs or FPGAs, firmware and/or hardware logic which in combination with the computer system causes or programs computer system 1200 to be a special-purpose machine.

A computer-implemented process may be performed by computer system 1200 in response to processor 1204 executing one or more sequences of one or more instructions contained in main memory 1206. Such instructions may be read into main memory 1206 from another storage medium, such as storage system 1210. Execution of the sequences of instructions contained in main memory 1206 causes processor 1204 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 1210) and/or volatile media (e.g., main memory 1206). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 1202. Transmission media can also take the form of acoustic or light waves, such as those generated during radio-wave and infra-red data communications.

Computer system 1200 also includes a network interface 1218 coupled to bus 1202. Network interface 1218 provides a two-way data communication coupling to a wired or wireless network link 1220 that is connected to a local, cellular or mobile network 1222. For example, communication interface 1218 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. In an implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through network 1222 to local computer system 1224 that is also connected to network 1222 or to data communication equipment operated by a network access provider 1226 such as, for example, an internet service provider or a cellular network provider. Network access provider 1226 in turn provides data communication connectivity to another data communications network 1228 (e.g., the internet). Networks 1222 and 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the networks 1222 and 1228, network link 1220 and communication interface 1218. In the internet example, a remote computer system 1230 might transmit a requested code for an application program through network 1228, network 1222 and communication interface 1218. The received code may be executed by processor 1204 as it is received, and/or stored in storage system 1210, or other non-volatile storage for later execution.

Conclusion

In the foregoing detailed description, embodiments of the present invention have been described with reference to numerous specific details that may vary from implementation to implementation. The detailed description and the figures are, accordingly, to be regarded in an illustrative rather than a restrictive sense.

Reference in the detailed description to an embodiment of the present invention is not intended to mean that the embodiment is exclusive of other disclosed embodiments of the present invention, unless the context clearly indicates otherwise. Thus, a described embodiment may be combined with one or more other described embodiments in a particular implementation, unless the context clearly indicates that the embodiments are incompatible with each other. Further, the described embodiments are intended to illustrate the present invention by example and are not intended to limit the present invention to the described embodiments.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

As used in the foregoing detailed description and in the appended claims of the various described implementations, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

For situations in which implementations discussed above collect information about users, the users may be provided with an opportunity to opt in/out of programs or features that may collect personal information. In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized rather than associated with a particular user. For example, the user preferences or user interactions may be generalized based on user demographics.

The invention claimed is:

1. A method for approximating a multi-objective model of a second pass ranker of a multistage feed ranking system of an online service using a single objective model at a first pass ranker of the multistage feed ranking system, the method comprising:
processing a first plurality of personalized feed requests;
generating a first plurality of second pass scores using the multi-objective model, the first plurality of second pass scores generated by a second pass ranker for a first plurality of feed item instances;
assigning a respective weight to each training example in a set of training examples based on assigning a first respective weight to a first training example in the set of training examples and assigning a second respective weight to a second training example in the set of training examples, wherein the first respective weight is different from the second respective weight;
wherein the set of training examples comprise the first plurality of feed item instances;
wherein, for each training example in the set of training examples, the respective weight is assigned to the training example based on a type of user input action taken on a feed item instance of the first plurality of feed item instances; and
training a machine learning model based on the set of training examples and the respective weights assigned to the set of training examples.

2. The method of claim 1, further comprising:
processing a second plurality of personalized feed requests;
via the first pass ranker, using the learned machine learning model to predict a plurality of positive user input action probabilities for a second plurality of feed item instances;
via the first pass ranker, selecting a third plurality of feed item instances from the second plurality of feed item instances based on the plurality of positive user input action probabilities for the second plurality of feed item instances;
via the second pass ranker, using the multi-objective model to score the third plurality of feed item instances and generating a second plurality of second pass scores for the third plurality of feed item instances; and
via the second pass ranker, selecting a fourth plurality of feed item instances, from the third plurality of feed item instances, to provide to viewers in personalized feeds based on the second plurality of second pass scores.

3. The method of claim 1, wherein the machine learning model comprises a logistic regression model.

4. The method of claim 1, wherein:
the first respective weight is numerically greater than the second respective weight;
the first respective weight is assigned to the first training example based on the type of user input action taken on a feed item instance being a viral user input action; and
the second respective weight is assigned to the second training example based on the type of user input action taken on a feed item instance being a click user input action.

5. The method of claim 1, wherein:
the first respective weight is numerically greater than the second respective weight;
the first respective weight is assigned to the first training example based on the type of user input action taken on a feed item instance being a click user input action; and
the second respective weight is assigned to the second training example based on the type of user input action taken on a feed item instance being a negative user action.

6. One or more non-transitory computer-readable media storing instructions for approximating a multi-objective model of a second pass ranker of a multistage feed ranking system of an online service using a single objective model at a first pass ranker of the multistage feed ranking system, the instructions, when executed by one or more processors, are capable of causing the one or more processors to perform:
processing a first plurality of personalized feed requests via a second pass ranker, generating a first plurality of second pass scores using the multi-objective model, the first plurality of second pass scores generated by the second pass ranker for a first plurality of feed item instances;
assigning a respective weight to each training example in a set of training examples based on assigning a first respective weight to a first training example in the set of training examples and assigning a second respective weight to a second training example in the set of training examples, wherein the first respective weight is different from the second respective weight;
wherein the set of training examples comprises the first plurality of feed item instances;
wherein, for each training example in the set of training examples, the respective weight is assigned to the training example based on a type of user input action taken on a feed item instance, of the first plurality of feed item instances; and
training a machine learning model based on the set of training examples and the respective weights assigned to the set of training examples.

7. The one or more non-transitory computer-readable media of claim 6, the instructions, when executed by the one or more processors, are capable of causing the one or more processors to perform:
processing a second plurality of personalized feed requests;
via the first pass ranker, using the learned machine learning model to predict a plurality of positive user input action probabilities for a second plurality of feed item instances;
via the first pass ranker, selecting a third plurality of feed item instances from the second plurality of feed item instances based on the plurality of positive user input action probabilities for the second plurality of feed item instances;

via the second pass ranker, using the multi-objective model to score the third plurality of feed item instances and generating a second plurality of second pass scores for the third plurality of feed item instances; and via the second pass ranker, selecting a fourth plurality of feed item instances, from the third plurality of feed item instances, to provide to viewers in personalized feeds based on the second plurality of second pass scores.

8. The one or more non-transitory computer-readable media of claim 7, wherein the machine learning model comprises a logistic regression model.

9. The one or more non-transitory computer-readable media of claim 7, wherein:
the first respective weight is numerically greater than the second respective weight;
the first respective weight is assigned to the first training example based on the type of user input action taken on a feed item instance being a viral user input action; and
the second respective weight is assigned to the second training example based on the type of user input action taken on a feed item instance being a click user input action.

10. The one or more non-transitory computer-readable media of claim 7, wherein:
the first respective weight is numerically greater than the second respective weight;
the first respective weight is assigned to the first training example based on the type of user input action taken on a feed item instance being a click user input action; and
the second respective weight is assigned to the second training example based on the type of user input action taken on a feed item instance being a negative user action.

11. A system for approximating a multi-objective model of a second pass ranker of a multistage feed ranking system of an online service using a single objective model at a first pass ranker of the multistage feed ranking system, the system comprising:
a processing device; and
a memory operably coupled to the processing device, wherein the memory comprises instructions that when executed by the processing device cause the processing device to:
processing a first plurality of personalized feed requests, at the second pass ranker, to generate a first plurality of second pass scores using the multi-objective model, the first plurality of second pass scores generated by the second pass ranker for a first plurality of feed item instances;
assign a respective weight to each training example in a set of training examples based on assigning a first respective weight to a first training example in the set of training examples and assigning a second respective weight to a second training example in the set of training examples, wherein the first respective weight is different from the second respective weight;
wherein the set of training examples comprises the first plurality of feed item instances;
wherein, for each training example in the set of training examples, the respective weight is assigned to the training example based on a type of user input action taken on a feed item instance, of the first plurality of feed item instances; and
train a machine learning model based on the set of training examples and the respective weights assigned to the set of training examples.

12. The system of claim 11, wherein the instructions, when executed by the processing device, cause the processing device to:
processing a second plurality of personalized feed requests;
at the first pass ranker, use the learned machine learning model to predict a plurality of positive user input action probabilities for a second plurality of feed item instances;
at the first pass ranker, select a third plurality of feed item instances from the second plurality of feed item instances based on the plurality of positive user input action probabilities for the second plurality of feed item instances;
at the second pass ranker, use the multi-objective model to score the third plurality of feed item instances and generating a second plurality of second pass scores for the third plurality of feed item instances; and
at the second pass ranker, select a fourth plurality of feed item instances, from the third plurality of feed item instances, to provide to viewers in personalized feeds based on the second plurality of second pass scores.

13. The system of claim 11, wherein the machine learning model comprises a logistic regression model.

14. The system of claim 11, wherein:
the first respective weight is numerically greater than the second respective weight;
the first respective weight is assigned to the first training example based on the type of user input action taken on a feed item instance being a viral user input action; and
the second respective weight is assigned to the second training example based on the type of user input action taken on a feed item instance being a click user input action.

15. The one or more non-transitory computer-readable media of claim 6, wherein:
the first respective weight is numerically greater than the second respective weight;
the first respective weight is assigned to the first training example based on the type of user input action taken on a feed item instance being a click user input action; and
the second respective weight is assigned to the second training example based on the type of user input action taken on a feed item instance being a negative user action.

* * * * *